(12) United States Patent
Tada et al.

(10) Patent No.: US 6,975,569 B2
(45) Date of Patent: Dec. 13, 2005

(54) OPTICAL DISK APPARATUS CAPABLE OF GENERATING CLOCK ACCURATELY

(75) Inventors: Koichi Tada, Gifu (JP); Toshitaka Kuma, Gifu (JP); Hiroshi Watanabe, Gifu (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 355 days.

(21) Appl. No.: 10/333,905

(22) PCT Filed: Oct. 18, 2001

(86) PCT No.: PCT/JP01/09162

§ 371 (c)(1),
(2), (4) Date: Jan. 31, 2003

(87) PCT Pub. No.: WO02/35527

PCT Pub. Date: May 2, 2002

(65) Prior Publication Data

US 2003/0147319 A1    Aug. 7, 2003

(30) Foreign Application Priority Data

Oct. 23, 2000   (JP)  ............................. 2000-322211

(51) Int. Cl.⁷ .............................................. G11B 5/09
(52) U.S. Cl. ............................. 369/47.28; 369/53.34; 369/59.17
(58) Field of Search ....................... 369/47.28, 53.34, 369/59.17, 59.18, 59.19, 59.15

(56) References Cited

U.S. PATENT DOCUMENTS 6,310,851 B1 * 10/2001 Tobita et al. ............... 369/111
6,324,145 B1 * 11/2001 Kobayashi et al. ......... 369/59.17
6,687,206 B1 *  2/2004 Masui ....................... 369/47.19
6,768,706 B1 *  7/2004 Tonami .................... 369/47.25
6,807,134 B2 * 10/2004 Nakajima et al. ......... 369/47.35

FOREIGN PATENT DOCUMENTS

| EP | 0 974 958 A1 | 1/2000 |
|---|---|---|
| EP | 0 986 051 A1 | 3/2000 |
| JP | 9-82031 | 3/1997 |
| JP | 11-306685 | 11/1999 |
| JP | 11-306686 | 11/1999 |
| WO | WO98/54703 | 12/1998 |
| WO | WO99/40576 | 8/1999 |
| WO | WO 01/88907 | 11/2001 |

* cited by examiner

Primary Examiner—Tan Dinh
Assistant Examiner—Van Pham
(74) Attorney, Agent, or Firm—Westerman, Hattori, Daniels & Adrian, LLP

(57) ABSTRACT

A digital signal processor (1045) arithmetically determines a comparison level for comparing each signal component by determining a comparison level of comparators (1033 and 1034) for comparing a fine clock mark signal such that a larger weight is assigned to the comparison level of the signal component already compared. The comparators (1033 and 1034) compare the fine clock mark signal with reference to a level set on a peak side and a level set on a bottom side. When digital signal processor (1045) receives the comparison signal from one of the comparators (1033 and 1034) prior to the comparison signal sent from the other, the digital signal processor produces a fine clock mark detection signal FCMT based on the comparison signal sent from a comparator (1047). Thereby, the clock can be accurately produced based on the fine clock mark signal even when a signal component having a larger amplitude than that of the fine clock mark signal is detected.

4 Claims, 19 Drawing Sheets

OPTICAL DISK APPARATUS CAPABLE OF GENERATING CLOCK ACCURATELY

This application is a 371 of PCT/SP01/09162 Oct. 18, 2001.

TECHNICAL FIELD

The present invention relates to an optical disk apparatus, which can accurately produce a clock for recording and/or reproducing signals based on phase information formed on an optical disk.

BACKGROUND ART

In optical disks such as a magneto-optical disk and a phase change disk, lands and grooves are formed alternately in a radial direction, and signals are recorded on both the lands and the grooves for achieving a high density.

According to AS-MO (Advanced Storaged Magneto Optical disk) standards, which are recently established, fine clock marks forming a reference for producing a clock, which is used for recording or reproducing data, are formed at predetermined intervals. The fine clock marks are specifically formed in such a manner that grooves each having a length of about 3 to 4 data channel bits are formed at predetermined intervals on the land, and lands each having a length of about 3 to 4 data channel bits are formed at predetermined intervals in the groove. The fine clock marks in the groove may be formed on one of surfaces of a substrate of a magneto-optical record medium by using two beams, in which case the two beams are moved to positions of the neighboring lands on opposite sides of the groove. The fine clock marks on the land are formed similarly to the fine clock marks in the groove by moving two beams to positions in the neighboring grooves on the opposite sides.

In the magneto-optical disk according to the AS-MO standards, a fine clock mark detection signal is produced by detecting the fine clock marks on the magneto-optical disk. A clock is produced based on the fine clock mark detection signal, and recording and reproducing of signals are performed in synchronization with the clock thus produced.

A scratch may be formed between fine clock marks, for example, during the manufacturing process of the magneto-optical disk, and a fine clock mark signal detected from the magneto-optical disk may contain a signal component due to the scratch. In this case, the clock cannot be produced accurately.

More specifically, if a scratch is present between fine clock marks, the fine clock mark signal has a signal waveform shown in FIG. 19. Signal components S1, S3 and S4 are generated based on fine clock marks, respectively, and a signal component S2 is generated due to the scratch. When the groove is scanned with a laser beam, signal components S1, S3 and S4 exhibit signal waveforms opposite to those exhibited when the land is scanned with the laser beam. For accurately producing the clock, therefore, it is necessary to determine whether the scanning with the laser beam is effected on the groove or the land. For this, signal components S1, S3 and S4 are compared based on levels L1 and L2, and it is determined whether the scanning with the laser beam is effected on the groove or land, depending on the level (i.e., level L1 or L2) used for earlier detection of the signal. Level L1 is determined to be substantially equal to half a peak value PA of signal component S1, which is held by a hold circuit. Level L2 is determined to be substantially equal to half a bottom value PB of signal component S1, which is held by the hold circuit. The hold circuit substantially follows peak value PA and bottom value PB even when a long time elapses from holding of peak and bottom values PA and PB of signal component S1.

If signal component S2 due to the scratch is applied to the hold circuit between input of signal component S1 and input of signal component S3, level L1 determined from the peak value shifts to level L3, and level L2 determined from the bottom value shifts to level L4 because the peak and bottom values of signal component S2 are larger than the peak and bottom values of each of signal components S1, S3 and S4 based on the fine clock marks, respectively. Since the hold circuit follows the peak or bottom values, level L3 is held at a value larger than the peak values of signal components S3 and S4, and level L4 is held at a value smaller than the bottom values of signal components S3 and S4. If signal component S2 due to the scratch is present, therefore, it is impossible to compare the subsequent signal components based on the fine clock marks, and the clock cannot be produced accurately.

DISCLOSURE OF THE INVENTION

Accordingly, an object of the present invention is to provide an optical disk apparatus, which can accurately generate a clock based on a fine clock mark even when a signal component of an amplitude larger than that of a fine clock mark signal is detected.

According to the invention, an optical disk apparatus for recording and/or reproducing a signal on and/or from an optical disk including a fine clock mark forming a reference for generation of a clock in synchronization with the clock, includes an optical pickup emitting a laser beam to the optical disk and detecting a reflected beam; a fine clock mark detecting circuit producing a fine clock mark detection signal by comparing a fine clock mark signal detected based on the fine clock mark by the optical pickup with reference to a predetermined level; and a clock producing circuit producing the clock by dividing the fine clock mark detection signal to provide a frequency equal to a predetermined integral submultiple of the input frequency in synchronization with the fine clock mark detection signal. The fine clock mark detecting circuit compares a signal component FCMk ($1 \leq k \leq n$) with reference to a comparison level Lk, and produces the fine clock mark detection signal based on the fact that the compared comparison signal is obtained, assuming that the fine clock mark signal includes signal components of n (n: natural number) in number containing the signal component FCMk to be compared and a signal component FCMk−1 compared immediately before comparison of the signal component FCMk, a comparison level Lk−1 is used for the signal component FCMk−1, the signal component FCMk has an amplitude of Pk, and the comparison level Lk is determined based on a weighted average of the comparison level Lk−1 and the amplitude Pk obtained by assigning a larger weight to the comparison level Lk−1 than a weight assigned to the amplitude Pk.

In the optical disk apparatus according to the invention, a large weight is assigned to the comparison level of the signal component, which is already subjected to comparison, of the fine clock mark signal, and each signal component is subjected to comparison with reference to the comparison level, which is arithmetically determined based on an average thus weighted. The signal component of the fine clock mark signal is detected in accordance with input of a comparison signal prepared by such comparison. When the signal component is detected, the fine clock mark detection signal is produced based on the fine clock mark signal, and the clock synchronized with the fine clock mark detection signal is produced so that the signal synchronized with the clock thus produced is recorded and/or reproduced.

According to the invention, therefore, even if the optical disk is scratched, the fine clock mark detection signal can be accurately produced.

Preferably, the fine clock mark detecting circuit of the optical disk apparatus produces a first comparison signal prepared by comparing the signal component with reference to a first level set on a peak side of the signal component FCMk, and a second comparison signal prepared by comparing the signal component FCMk with a second level set on a bottom side of the signal component FCMk, and produces the fine clock mark detection signal based on the fact that the first or second comparison signal is obtained. The first level is determined based on the weighted average using a comparison level LPk−1 set on the peak side of the signal component FCMk−1 and a peak value PPk of the signal component FCMk. The second level is determined based on the weighted average using a comparison level LBk−1 set on the bottom side of the signal component FCMk−1 and a bottom value PBk of the signal component FCMk.

Each signal component of the fine clock mark signal is compared with reference to the level set on the peak value side of the fine clock mark signal and the level set on the bottom value side thereof. When either of two comparison signals is detected, the fine clock mark detection signal is produced.

According to the invention, therefore, the fine clock mark detection signal can be accurately produced even when the fine clock mark signal is lost on the upper or lower side of a reference line.

Preferably, the fine clock mark detecting circuit of the optical disk apparatus includes a first comparator producing the first comparison signal by comparing the signal component FCMk with reference to the first level, a second comparator producing the second comparison signal by comparing the signal component FCMk with reference to the second level, a first hold circuit holding the peak value PPk based on the signal component FCMk, a second hold circuit holding the bottom value PBk based on the signal component FCMk, a third comparator producing a third comparison signal by comparing the signal component FCMk with reference to the predetermined level, and a signal processing circuit producing the fine clock mark detection signal based on the third comparison signal by arithmetically determining the first level from a weighted average using the comparison level LPk−1 and the peak value PPk, arithmetically determining the second level from a weighted average using the comparison level LBk−1 and the bottom value PBk, and arithmetically determining the predetermined level based on the peak and bottom values PPk and PBk in response to input of the first or second comparison signal.

In the fine clock mark detecting circuit, each signal component of the fine clock mark signal is compared with reference to the level of the fine clock mark signal set on the peak value side and that set on the bottom value side. When either of the two comparison signals is detected, the fine clock mark signal is compared with reference to a predetermined level so that the fine clock mark detection signal synchronized with the position, where the fine clock mark signal crosses a reference line, is produced.

According to the invention, therefore, the fine clock mark detection signal, which is synchronized with a center position of the fine clock mark, can be accurately produced even if the upper or lower side of the fine clock mark signal with respect to the reference line is lost.

Preferably, the optical pickup of the optical disk apparatus detects the fine clock mark signal in a tangential push-pull method.

The fine clock mark signal is detected as a difference between intensities of the two laser beams in a tangential direction of the optical disk.

According to the invention, therefore, the clock can be accurately produced from the optical disk, in which phase information forming a reference for clock production is written as irregularities on a substrate surface of the optical disk.

BEST MODE FOR CARRYING OUT THE INVENTION

Figure 1:
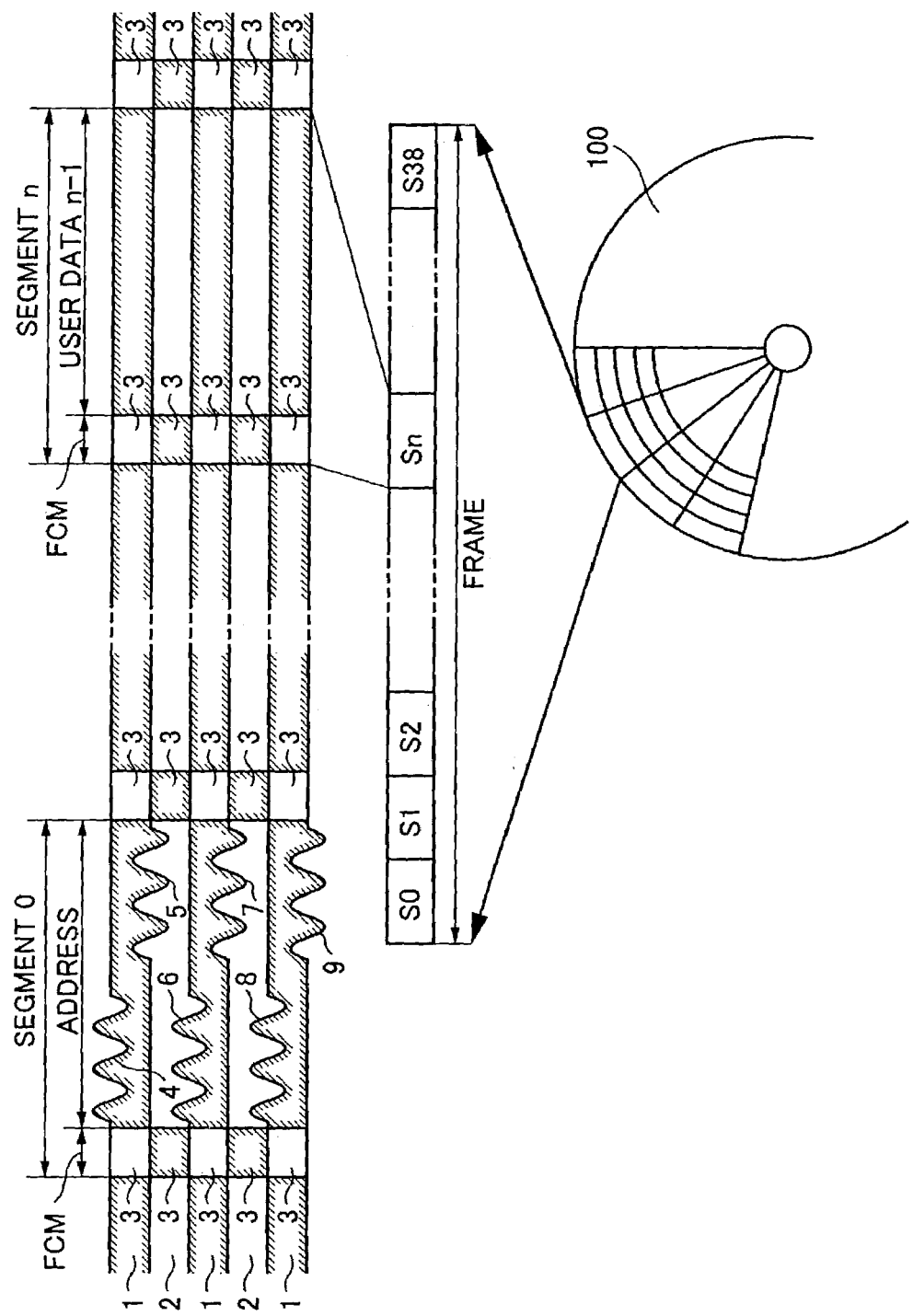
FIG. 1 is a plan showing a magneto-optical record medium and a format thereof.

An embodiment of the invention will now be described with reference to the drawings. In the drawings, the same or corresponding portions bear the same reference numbers, and description thereof is not repeated.

Referring to FIG. 1, description will now be given on a magneto-optical record medium, on and/or from which data is recorded and/or reproduced by an optical disk apparatus according to the invention. A magneto-optical record medium 100 is provided with frames, which have equal sizes and form record units, respectively. Each frame is formed of 39 segments S0, S1 S2, . . . and S38.

Magneto-optical record medium 100 has a planar structure, in which grooves 1 and lands 2 are arranged alternately in the radial direction. Grooves 1 and lands 2 extend spirally or concentrically. Each segment has a length of 532 DCBs (Data Channel Bits), and is provided at its start position with a Fine Clock Mark (FCM) 3 representing phase information of a clock for recording and reproducing data. Fine clock marks 3 are formed by arranging lands of equal lengths at equal intervals in groove 1, and by arranging grooves of equal lengths at equal intervals in land 2. Segment S0 in a start position of each frame is provided at a position following fine clock mark 3 with address information, which represents an address on magneto-optical record medium 100, and is defined by wobbles 4–9. The address information is preformatted during manufacturing of the magneto-optical record medium 100. Magneto-optical record medium 100 is provided with a magnetic layer covering preformatted grooves 1, lands 2, fine clock marks 3 and wobbles 4–9. A laser beam is emitted to the magnetic layer, and a magnetic field modulated by a record signal is applied so that the signal is recorded on magneto-optical record medium 100. Also, a laser beam of a predetermined intensity is emitted to the magnetic layer, and a reflected beam thereof is detected so that the signal is reproduced from magneto-optical record medium 100.

Wobbles 4 and 5 are formed in accordance with the same address information on the opposite walls of the same groove 1. Likewise, wobbles 6 and 7 as well as wobbles 8 and 9 are formed on the opposite walls of the same grooves 1 for storing the same address information, respectively. The above manner of recording the address information is referred to as "single-sided stagger type". By the single-sided stagger type, the address information can be detected accurately even when the laser beam shifts from the center of groove 1 or land 2 due to a tilt or the like of magneto-optical record medium 100.

Regions including the address information and the fine clock mark 3 are not utilized for recording user data. Segment Sn is formed of fine clock mark 3 and user data n−1.

Figure 2:
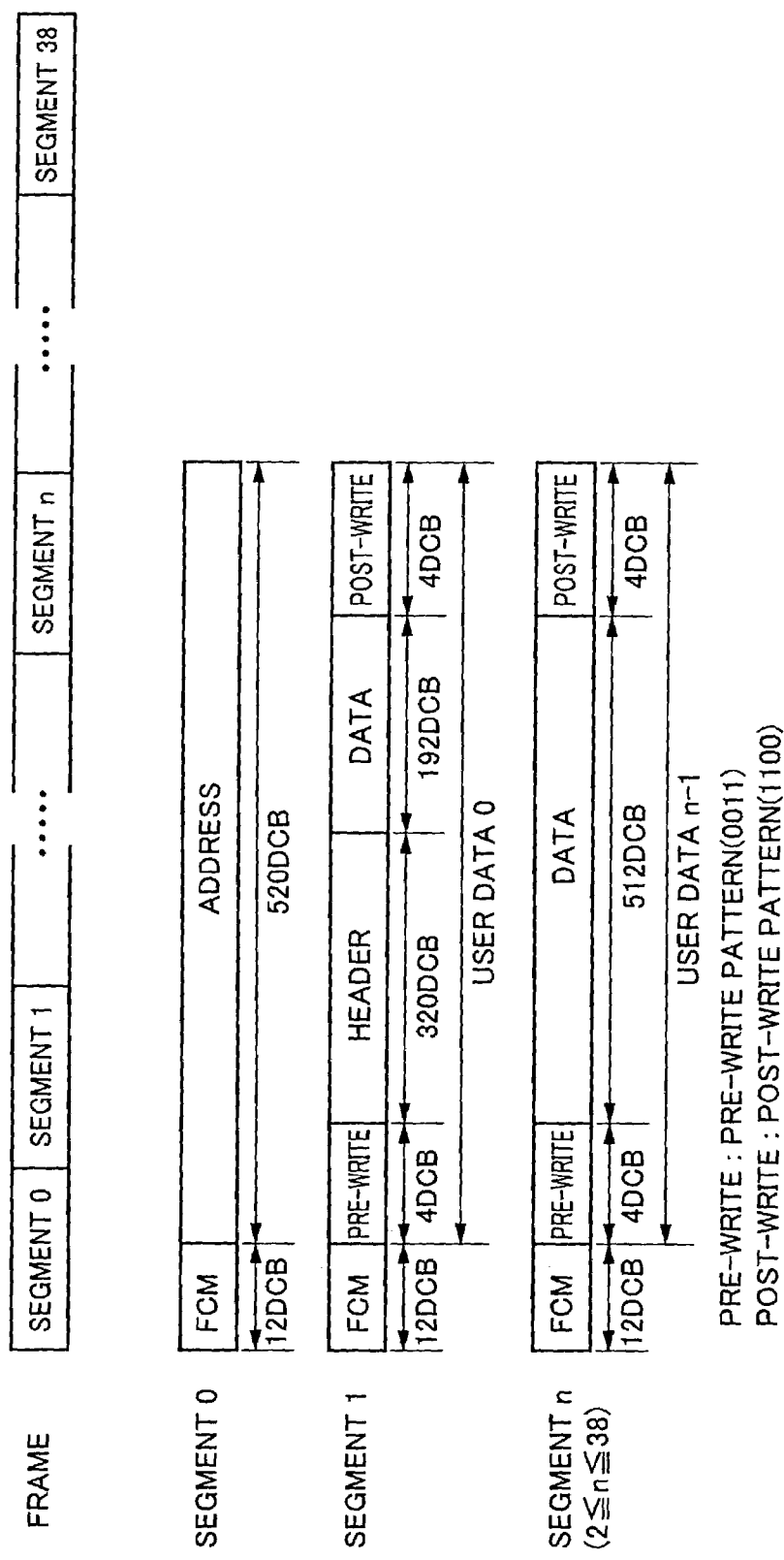
FIG. 2 schematically shows a format of recorded data rows.

Referring to FIG. 2, specific structures of segments will now be described. Among segments S0, S1, S2, . . . S38 forming the frame, segment S0 is an address segment preformatted on magneto-optical record medium 100. Segments S1–38 are data segments provided as regions for recording the user data. Segment S0 is formed of a fine clock mark region FCM of 12 DCBs and an address of 520 DCBs. Segment S1 is formed of fine clock mark region FCM of 12 DCBs, a pre-write of 4 DCBs, data of 512 DCBs and a post-write of 4 DCBs.

The pre-write represents a start of data, and is formed of a predetermined pattern, e.g., of "0011". The post-write represents an end of data, and is formed of a predetermined pattern, e.g., of "1100".

For example, the user data region in segment S1 includes a header, which is formed of a fixed pattern for confirming a position of data for reproduction, compensating a phase of a reproduction clock, performing adjustment of a laser power and others. The fixed pattern recorded as the header is a so-called DC-free pattern, in which a DC component is suppressed, and includes a plurality of domains of 2T at intervals of 2T as well as a predetermined number of domains of 8T at intervals of 8T.

The phase compensation is performed by such adjustment that the timing of sampling of an analog signal obtained by reproducing the domains of 2T may match with the phase of the clock used for recording and reproducing the data. Also, the laser power is adjusted by reproducing domains of 2T and 8T such that a ratio of 50% or more may be achieved by the intensity of the reproduced signal of the domains of 8T with respect to the intensity of the reproduced signal of the domains of 2T. Further, the position of data during reproduction is confirmed by reproducing the domains of 8T and determining whether the position of the digital signal prepared from the reproduced signal may match with an expected position of the digital signal of the domains of 8T or not. Further, each of the patterns of the pre-write, post-write and header is recorded continuously to the user data when recording the user data.

Each of segments S2–S38 is formed of fine clock mark region FCM of 12 DCBs, the pre-write of 4 DCBs, the data of 512 DCBs and the post-write of 4 DCBs.

Regions, which are pre-formatted, e.g., for fine clock marks FCM and address, are referred to as "pre-formatted regions".

Figure 3:
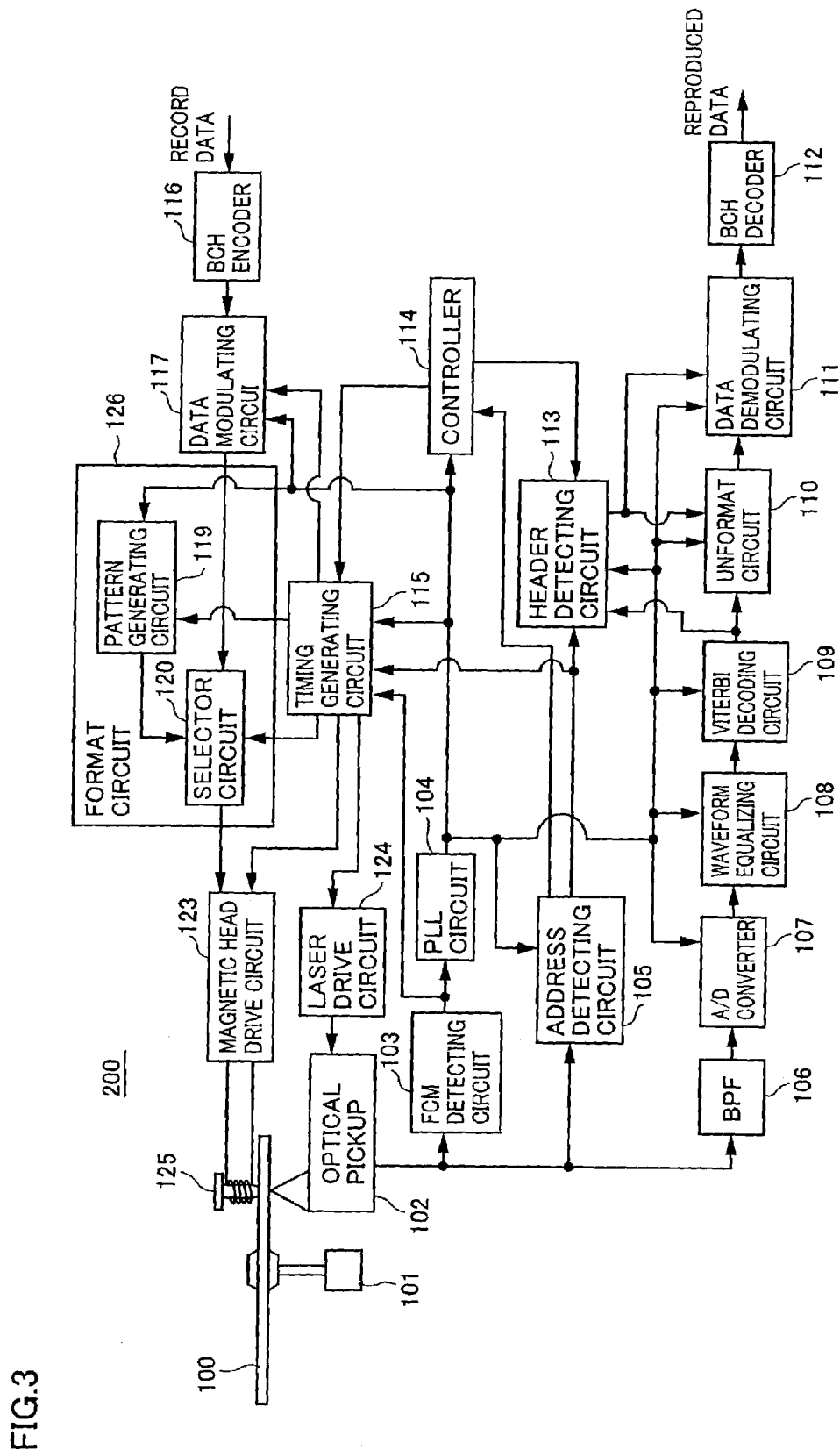
FIG. 3 is a block diagram of an optical disk apparatus of a first embodiment.

Referring to FIG. 3, description will now be given on an optical disk apparatus according to the invention. An optical disk apparatus 200 includes a spindle motor 101, an optical pickup 102, a fine clock mark detecting circuit (FCM detecting circuit) 103, a PLL circuit 104, an address detecting circuit 105, a BPF 106, an A/D converter 107, a waveform equalizing circuit 108, a Viterbi decoding circuit 109, an unformat circuit 110, a data demodulating circuit 111, a BCH decoder 112, a header detecting circuit 113, a controller 114, a timing generating circuit 115, a BCH encoder 116, a data modulating circuit 117, a format circuit 126, a magnetic head drive circuit 123, a laser drive circuit 124 and a magnetic head 125. Format circuit 126 includes a pattern generating circuit 119 and a selector circuit 120.

Spindle motor 101 drives a magneto-optical record medium 100 at a predetermined rotation speed. Optical pickup 102 emits a laser beam to magneto-optical record medium 100, and detects a reflected beam therefrom. FCM detecting circuit 103 detects a fine clock mark detection signal FCMT indicating a position of fine clock mark 3 on magneto-optical record medium 100 from optical pickup 102, which detects such a position as will be described later, and outputs fine clock mark detection signal FCMT thus detected to PLL circuit 104 and timing generating circuit 115.

PLL circuit 104 produces a clock CK based on fine clock mark detection signal FCMT applied from FCM detecting circuit 103, and sends clock CK thus produced to address detecting circuit 105, A/D converter 107, waveform equalizing circuit 108, Viterbi decoding circuit 109, unformat circuit 110, data demodulating circuit 111, controller 114, timing generating circuit 115, data modulating circuit 117, format circuit 126 and pattern generating circuit 119.

Address detecting circuit 105 receives an address signal ADA, which is detected by optical pickup 102 from segment S0 on magneto-optical record medium 100 in the radial push-pull method, detects address information AD in synchronization with clock CK applied from PLL circuit 104, and produces an address detection signal ADF, which indicates the fact that address information AD is detected, at the end position in the address information. Detected address information AD is sent to controller 114, and produced address detection signal ADF is sent to header detecting circuit 113 and timing generating circuit 115.

BPF 106 removes a high range and a low range of a signal RF reproduced from magneto-optical record medium 100. A/D converter 107 converts reproduced signal RF from an analog form to a digital form in synchronization with clock CK sent from PLL circuit 104.

Waveform equalizing circuit 108 performs PR(1,1) waveform equalization on reproduced signal RF, which is converted into the digital form in synchronization with clock CK sent from PLL circuit 104. More specifically, the equalization is performed such that waveform interference may occur at a rate of 1 to 1 between data before the detection signal and data after the same.

Viterbi decoding circuit 109 converts reproduced signal RF from a multi-valued form to a binary form in synchronization with clock CK sent from PLL circuit 104, and applies reproduced signal RF thus converted to unformat circuit 110 and header detecting circuit 113.

Unformat circuit 110 removes the pre-write, post-write and header recorded in the user data region on magneto-optical record medium 100 in synchronization with a timing signal sent from header detecting circuit 113.

Data demodulating circuit 111 receives reproduced signal RF, which is unformatted, and demodulates it for demodulating the digital modulation performed at the time of recording, in synchronization with clock CK sent from PLL circuit 104.

BCH decoder 112 corrects errors in the reproduced signal thus demodulated, and outputs it as reproduced data. Header detecting circuit 113 detects the position of the header included in the reproduced signal based on address information AD sent from controller 114 and address detection signal ADF sent from address detecting circuit 105, and produces the timing signals of pre-write and header from the reproduced signal in synchronization with clock CK sent from PLL circuit 104. A timing signal TW of header thus produced is supplied to unformat circuit 110 and data demodulating circuit 111.

Controller 114 receives address information AD detected by address detecting circuit 105, and controls a servo-mechanism (not shown) based on address information AD to move optical pickup 102 to an intended position for access. Controller 114 outputs address information AD to header detecting circuit 113 in synchronization with clock CK sent from PLL circuit 104, and controls timing generating circuit 115.

Under the control of controller 114, timing generating circuit 115 produces a timing signal SS, which is based on fine clock mark detection signal FCMT sent from FCM detecting circuit 103 and address detection signal ADF sent from address detecting circuit 105, in synchronization with clock CK sent from PLL circuit 104, and applies timing signal SS thus produced to pattern generating circuit 119 and selector circuit 120 of format circuit 126 as well as magnetic head drive circuit 123 and laser drive circuit 124.

BCH encoder 116 adds an error correction code to the record data. Data modulating circuit 117 modulates the record data into a predetermined form. Format circuit 126 adds the pre-write, header and post-write to the record data sent from data modulating circuit 117 in accordance with timing signal SS sent from timing generating circuit 115 so that the record data may match with the user data region. Format circuit 126 selectively applies the formatted record data and the pattern data to be recorded in the preformat region to magnetic head drive circuit 123 based on timing signal SS sent from timing generating circuit 115.

Pattern generating circuit 119 produces the pattern data to be recorded in the preformat region and the pattern data serving as the pre-write, header and post-write in synchronization with clock CK sent from PLL circuit 104, and applies the produced data patterns to selector circuit 120.

Selector circuit 120 selects the record data sent from data modulating circuit 117 and the pattern data sent from pattern generating circuit 119 based on timing signal SS sent from timing generating circuit 115, and applies the selected data to magnetic head drive circuit 123.

Magnetic head drive circuit 123 drives magnetic head 125 in synchronization with each timing of timing signal SS sent from timing generating circuit 115 and based on the output of format circuit 126.

Laser drive circuit 124 drives semiconductor laser (not shown) in optical pickup 102 based on timing signal SS sent from timing generating circuit 115.

Magnetic head 125 is driven by magnetic head drive circuit 123, and applies a magnetic field, which is magnetically modulated in accordance with the record data or data pattern, to magneto-optical record medium 100.

Figure 4:
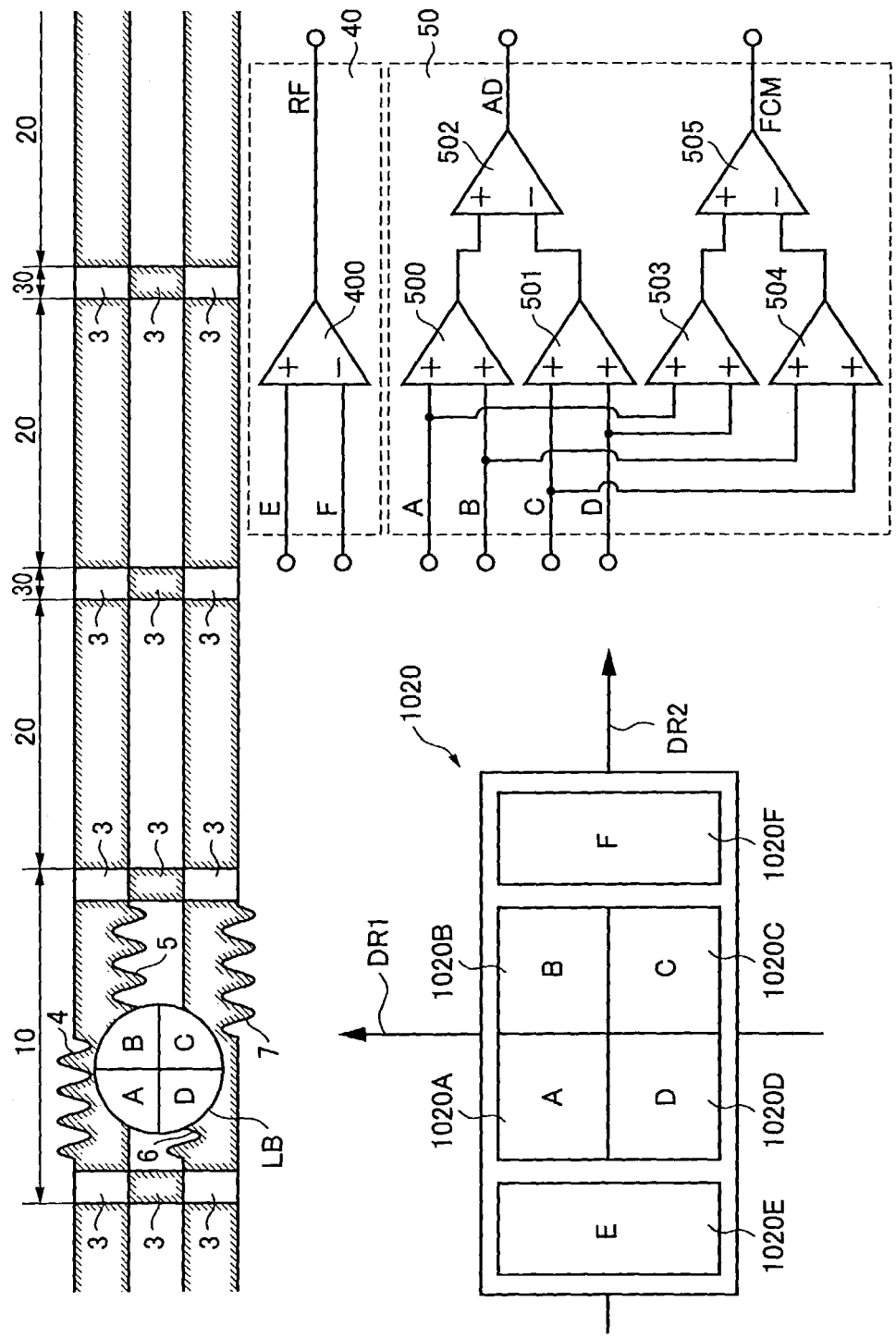
FIG. 4 shows reproduction of data from a preformat region and a user data region.

Referring to FIG. 4, description will now be given on detection of address information AD, a fine clock mark signal FCM and a magneto-optical signal RF on magneto-optical record medium 100. Regions 10 and 30 are preformat regions, which are preformatted at the time of manufacturing of magneto-optical record medium 100. Region 10 is provided with wobbles 4–7 and fine clock marks 3. Region 30 is provided with fine clock marks 3. A region 20 forms a user data region for recording the user data.

Optical pickup 102, which emits the laser beam to magneto-optical record medium 10 and detects the reflected beam therefrom, includes a photo detector 1020 having six detection regions 1020A, 1020B, 1020C, 1020D, 1020E and 1020F. Regions A1020A and B1020B are arranged in a tangential direction DR2. Likewise, regions C1020C and D1020D as well as regions E1020E and F1020F are arranged in tangential direction DR2 relatively to each other. Regions A120A and D1020D are arranged in a radial direction DR1 of magneto-optical record medium 100, and regions B1020B and C1020C are likewise arranged in radial direction DR1.

Regions A1020A, B1020B, C1020C and D1020D detect laser beams LB, which are emitted to magneto-optical record medium 100 and are reflected by regions A, B, C and D, respectively. Regions E1020E and F1020F detect the laser beams LB, which are reflected by whole the regions A, B, C and D, and are diffracted in different two directions of a plane of polarization by a Wollaston prism (not shown) included in optical pickup 102.

Reproduced signal RF of the magneto-optical signal recorded in region 20, which is a user data region, is detected by arithmetically determining a difference between a laser beam intensity [E] detected by region E1020E of photo detector 1020 and a laser beam intensity [F] detected by region F1020F. Thus, a subtracter 400 of a circuit 40 arithmetically determines the difference between laser beam intensity [E] detected by region E1020E of photo detector 1020 and laser beam intensity [F] detected by region F1020F, and outputs reproduced signal RF equal to ([E]−[F]).

The reproduced signal of address information AD recorded by wobbles 4–7 in region 10, which forms the preformat region, is detected in a radial push-pull method, and is detected as a difference obtained by extracting a sum of laser beam intensities [C] and [D] detected by regions C1020C and D1020D from a sum of laser beam intensities [A] and [B] detected by regions A1020A and B1020B. Address information AD is detected by adders 500 and 501 and a subtracter 502 in a circuit 50. Adder 500 obtains and outputs a sum [A+B] of laser beam intensities [A] and [B] detected by regions A1020A and B1020B. Adder 501 obtains and outputs a sum [C+D] of laser beam intensities [C] and [D] detected by regions C1020C and D1020D. Subtracter 502 subtracts the output [C+D] of adder 501 from the output [A+B] of adder 500 to output a reproduced signal AD (=[A+B]−[C+D]) of the address information.

Fine clock mark FCM of region 30 forming the preformat region is detected by a tangential push-pull method, and thus is detected as a difference obtained by subtracting a sum of laser beam intensities [B] and [C] detected by regions B1020B and C1020C from a sum of laser beam intensities [A] and [D] detected by regions A1020A and D1020D. More specifically, fine clock marks FCM are detected by adders 503 and 504 and a subtracter 505 in circuit 50. Adder 503 outputs a sum [A+D] of laser beam intensities [A] and [D] detected by regions A1020A and D1020D. Adder 504 outputs a sum [B+C] of laser beam intensities [B] and [C] detected by regions B1020B and C1020C. Subtracter 505 subtracts output [B+C] of adder 504 from output [A+D] of adder 503, and outputs reproduced signal FCM (=[A+D]−[B+C]) of the fine clock mark.

Figure 5:
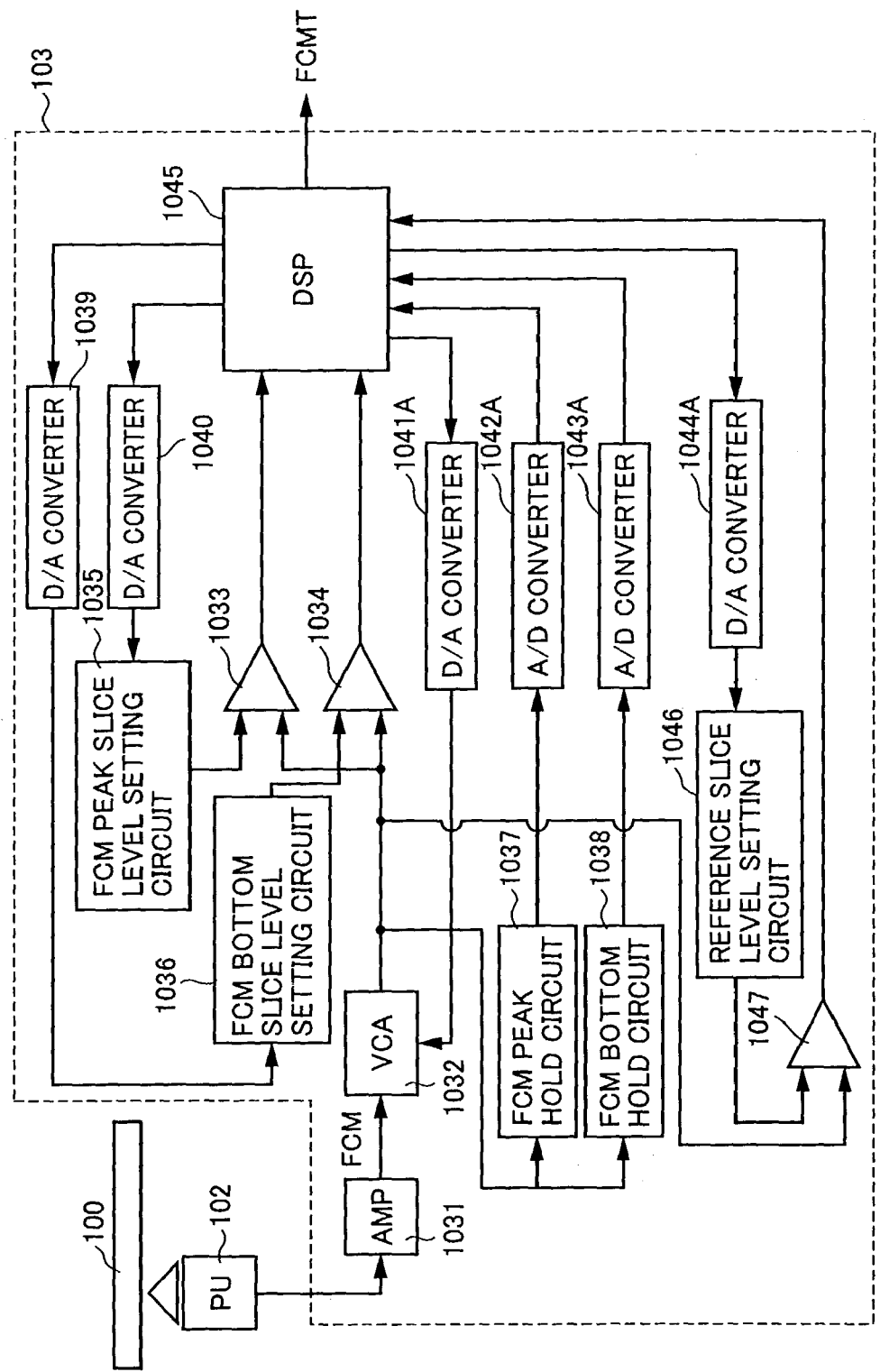
FIG. 5 is a block diagram showing an FCM detecting circuit of the optical disk apparatus shown in FIG. 3.

Referring to FIG. 5, FCM detecting circuit 103 shown in FIG. 3 includes an amplifier 1031, a voltage controlled amplifier 1032, comparators 1033, 1034 and 1047, an FCM peak slice level setting circuit 1035, an FCM bottom slice level setting circuit 1036, an FCM peak hold circuit 1037, an FCM bottom hold circuit 1038, D/A converters 1039, 1040, 1041A and 1044A, A/D converters 1042A and 1043A, a digital signal processor 1045 and a reference slice level setting circuit 1046.

Amplifier 1031 amplifies fine clock mark signal FCM detected by optical pickup 102 to a predetermined level. Voltage controlled amplifier 1032 further amplifies fine clock mark signal FCM amplified by amplifier 1031 in accordance with a value of voltage, which is output from digital signal processor 1045 and is converted by D/A converter 1041A into an analog signal.

Figure 6:
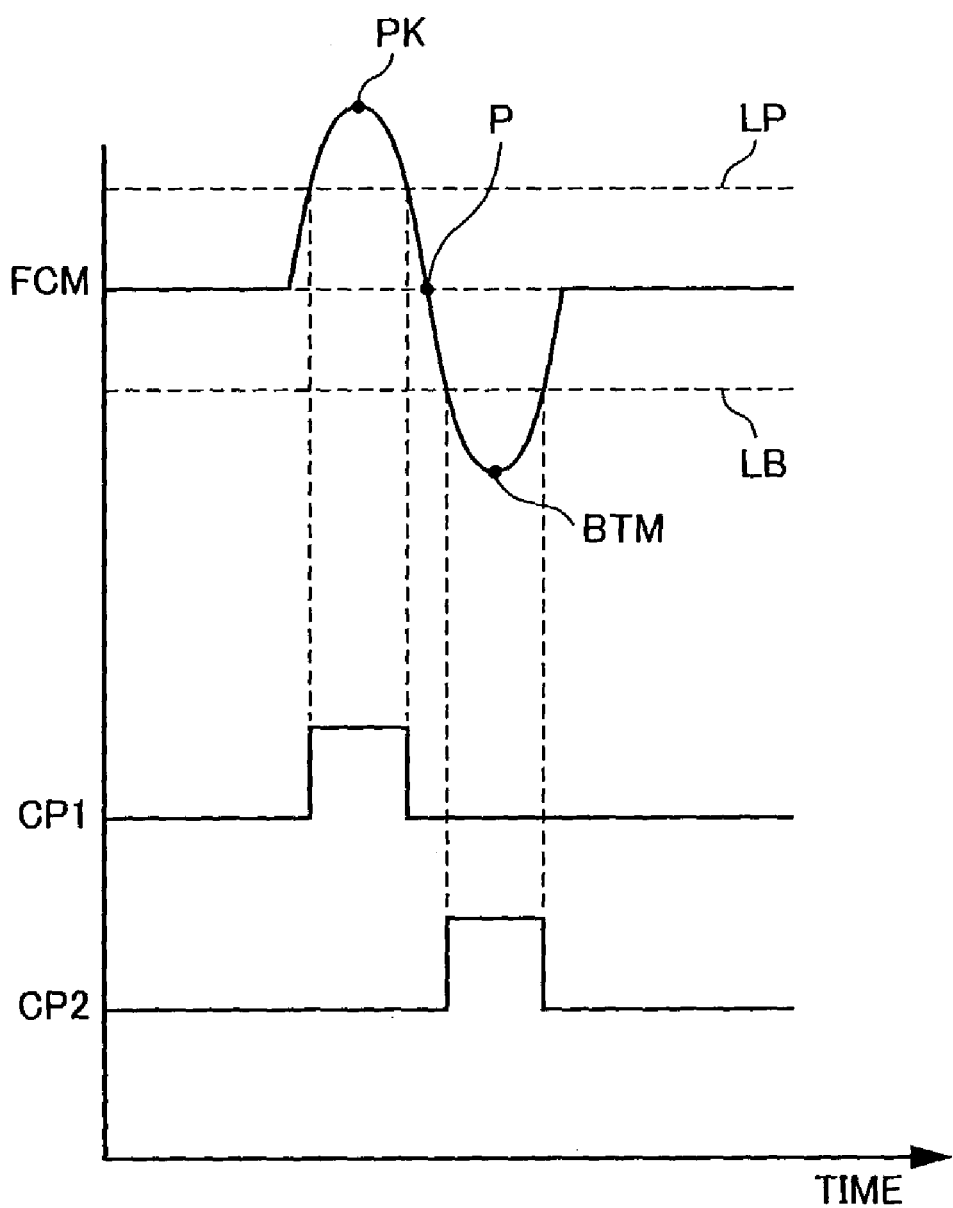
FIG. 6 is a timing chart representing signals in the FCM detecting circuit shown in FIG. 5.

Referring to FIG. 6, comparator 1033 compares fine clock mark signal FCM with reference to a level LP set by FCM peak slice level setting circuit 1035, and outputs a comparison signal CP1 thus prepared to digital signal processor 1045. Comparator 1034 compares fine clock mark signal FCM with reference to a level LB set by FCM bottom slice level setting circuit 1036, and outputs a comparison signal CP2 thus prepared to digital signal processor 1045.

Referring to FIG. 5 again, FCM peak slice level setting circuit 1035 sets a comparison level for comparing fine clock mark signal FCM based on the level determined by digital signal processor 1045. FCM bottom slice level setting circuit 1036 sets the other comparison level for comparing fine clock mark signal FCM based on the level determined by digital signal processor 1045.

FCM peak hold circuit 1037 holds the peak value of fine clock mark signal FCM. FCM bottom hold circuit 1038 holds a bottom value of fine clock mark signal FCM. D/A converters 1039 and 1040 convert the digital signals, which are output from digital signal processor 1045 for setting the comparison level, into analog signals. D/A converter 1041A converts the digital signal, which is output from digital signal processor 1045 for setting an amplification factor, into an analog signal. A/D converters 1042A and 1043A convert the hold signals held by FCM peak hold circuit 1037 and FCM bottom hold circuit 1038 from analog signals into digital signals, respectively.

Reference slice level setting circuit 1046 sets the comparison level of comparator 1047. Comparator 1047 compares fine clock mark signal FCM with reference to the level set by reference slice level setting circuit 1046.

Figure 7:
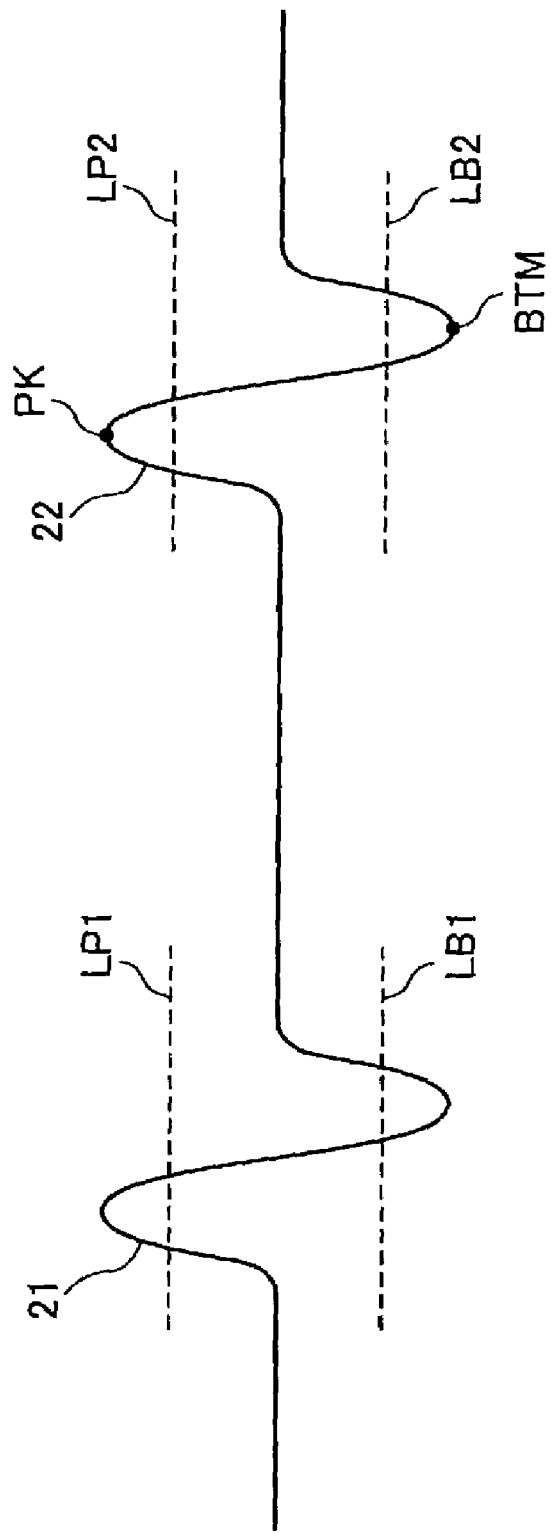
FIG. 7 is a waveform diagram of a fine clock mark signal.

Referring to FIGS. 5 and 7, digital signal processor 1045 is supplied with a peak value PK of signal component 22 of fine clock mark signal FCM to be compared after it is converted into a digital signal by FCM peak hold circuit 1037 and A/D converter 1042A, and is also supplied with a bottom value BTM of signal component 22 after conversion into a digital signal by FCM bottom hold circuit 1038 and A/D converter 1043A. Digital signal processor 1045 uses a comparison level LP1 used for comparison of a signal component 21 immediately preceding signal component 22 as well as peak value PK of signal component 22, and arithmetically determines a comparison level LP2 of signal component 22 based on a weighted average. Further, digital signal processor 1045 uses a comparison level LB1 used for comparison of signal component 21 immediately preceding signal component 22 as well as bottom value BTM of signal component 22, and arithmetically determines comparison level LB2 of signal component 22 based on a weighted average. In this case, comparison level LP2 is obtained by the following formula (1):

$$LP2=0.5\times((3\times LP1+PK)/4) \tag{1}$$

Comparison level LB2 is obtained by the following formula (2):

$$LB2=0.5\times((3\times LB1+BTM)/4) \tag{2}$$

Thus, weighted averages are determined based on such a relationship that the weights assigned to comparison levels LP1 and LB1 of signal component 21 immediately preceding signal component 22 to be compared are larger than those assigned to peak and bottom values PK and BTM of signal component 22 to be compared, respectively, and comparison levels LP2 and LB2 are arithmetically obtained by multiplying results of such averages by 0.5.

Comparison levels LP1 and LB1 are also arithmetically determined in accordance with the foregoing formulas (1) and (2), respectively. Thus, the invention has such a distinctive feature that the comparison level of the signal component to be compared is determined by assigning a larger weight to the comparison level used for comparison of the signal component immediately preceding the signal component to be compared. Among signal components FCMn of n (n: natural number) in number forming fine clock mark signal, it is assumed that signal component FCMk (k: natural number satisfying (1≦k≦n)) is to be compared, signal component FCMk−1 immediately precedes signal component FCMk, signal component FCMk has a peak value of PKk, comparison level LPk−1 is used for signal component FCMk−1, a weight a is assigned to comparison level LPk−1, and a weight b (a>>b) is assigned to peak value PKk. In this case, comparison level LPk set on the peak side of signal component FCMk is obtained by the following formula (3):

$$LPk=0.5\times((a\times LPk-1+b\times PKk)/(a+b)) \tag{3}$$

Comparison level LBk set on the bottom side of signal component FCMk is also obtained arithmetically by the above formula (3).

According to the invention, a sum (a+b) of weights a and b is in a range between four and eight, and weight b is preferably equal to one.

Even if fine clock mark signal FCM contains a signal component due to a scratch, comparator 1033 or 1034 in the above structure can compare the signal component supplied subsequently to the signal component due to the scratch with reference to level LP or LB, which is set between the reference line and peak value PK or between the reference line and bottom value BTM.

Digital signal processor 1045 outputs determined levels LP2 and LB2 to D/A converters 1039 and 1040, respectively.

When digital signal processor 1045 receives comparison signal CP1 or CP2 from one of comparators 1033 and 1034, it stops receiving of the other comparison signal CP2 or CP1, and produces the fine clock mark detection signal based on fine clock mark signal FCM, which was used for producing comparison signal CP1 or CP2 already received. Thus, during scanning of groove 1 on magneto-optical record medium 100 with a laser beam, fine clock mark signal FCM has a waveform shown in FIG. 6 so that comparison signal CP1 is input to digital signal processor 1045 prior to signal CP2. During scanning of land 2 with a laser beam, fine clock mark signal FCM has a waveform, of which polarity is inverted from that shown in FIG. 6, so that comparison signal CP2 is input to digital signal processor 1045 prior to signal CP1.

Figure 8:
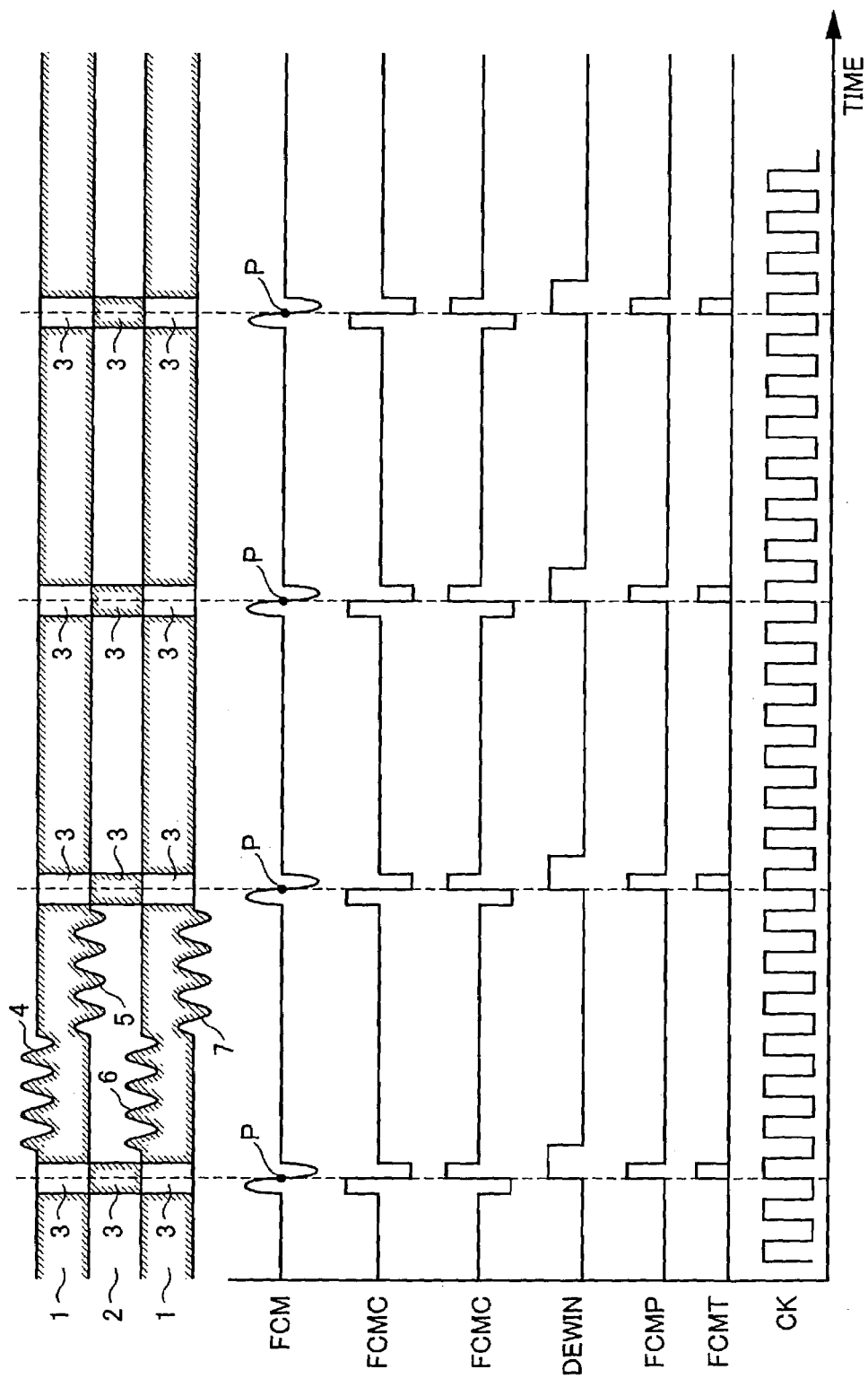
FIG. 8 shows production of a fine clock mark detection signal and a clock.

When comparison signal CP1 is input prior to the other, digital signal processor 1045 performs an arithmetic operation based on comparison level LP to obtain the reference slice level, which is used for determining a crossing point between fine clock mark signal FCM and the reference line. Thus, the level of reference line is arithmetically determined. Digital signal processor 1045 outputs the determined reference slice level to D/A converter 1044. D/A converter 1044 converts the reference slice level from a digital signal to an analog signal, and outputs it to reference slice level setting circuit 1046. Reference slice level setting circuit 1046 sets the input reference slice level to comparator 1047. Comparator 1047 compares fine clock mark signal FCM with reference to the reference slice level, and outputs a comparison signal FCMC shown in FIG. 8 to digital signal processor 1045. Comparison signal FCMC has a polarity changing at a position of point P.

Thereby, digital signal processor 1045 inverts comparison signal FCMC to produce a detection window signal DEWIN. Detection window signal DEWIN has an amplitude width of 6 DCBs. Digital signal processor 1045 performs logical AND between inverted signal/FCMC and detection window signal DEWIN to produce a signal FCMP. Digital signal processor 1045 produces a fine clock mark detection signal FCMT of an amplitude of 1 DCB in synchronization with rising of signal FCMP.

When comparator 1034 supplies comparison signal CP2 to digital signal processor 1045 prior to comparison signal CP1, digital signal processor 1045 produces fine clock mark detection signal FCMT. When comparison signal CP2 is supplied to digital signal processor 1045 prior to the other signal, a fine clock mark signal having a waveform, which is inverted with respect to that shown in FIG. 6, is applied so that the comparison signal supplied from comparator 1047 to digital signal processor 1045 has the same waveform as signal/FCMC. Therefore, digital signal processor 1045 performs logical AND between the comparison signal received from comparator 1047 and detection window signal DEWIN without inverting the received comparison signal.

Figure 9:
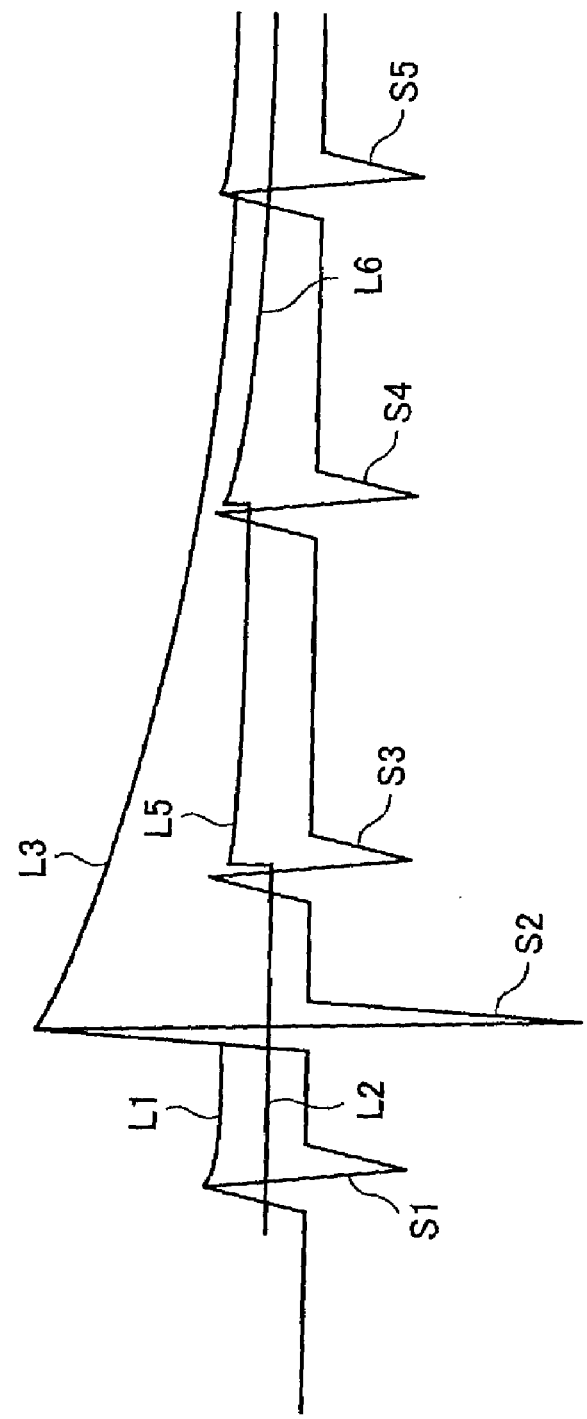
FIG. 9 is a waveform diagram of the fine clock mark signal containing a signal component due to a scratch.

Referring to FIG. 9, digital signal processor 1045 arithmetically determines the comparison level of comparator 1033 based on the foregoing weighted averages. Thereby, even if signal component S2 due to a scratch is present between signal components S1 and S3 of the fine clock mark signal, the comparison level of comparator 1033 is set between the reference line of signal components S3–S5 and the peak value. Thus, even if the peak value held by the hold circuit increases from L1 to L3, the comparison level of comparator 1033 merely shifts from L2 to L5 and L6, and does not exceed the peak value of signal components S3–S6. Accordingly, even if magneto-optical record medium 100 is scratched, fine clock mark signal FCM can be accurately detected.

Figure 10:
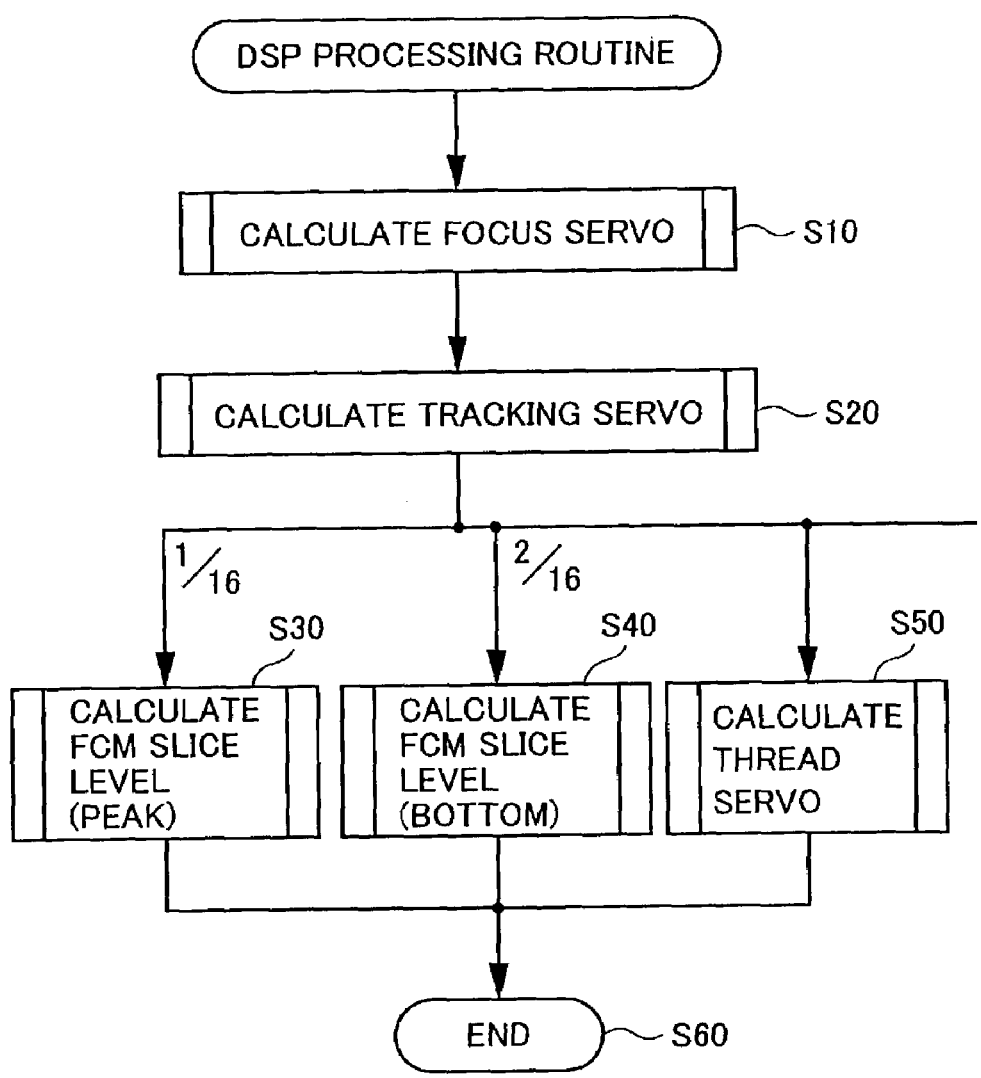
FIG. 10 is a flowchart representing a routine of processing of a digital signal processor shown in FIG. 5.

Referring to FIG. 10, description will now be given on a processing routine of digital signal processor 1045. Digital signal processor 1045 calculates focus servo of the laser beam emitted from optical pickup 102 (step S10), and calculates tracking servo of the laser beam after turn-on of the focus servo of the laser beam (step S20). After the tracking servo of the laser beam is performed based on the results of calculation, the calculation of FCM slice level (peak value) in step S30, the calculation of FCM slice level (bottom value) in step S40 and the calculation of thread servo in step S50 are performed at a rate of one time in sixteen times. Digital signal processor 1045 has a processing performance capable of one arithmetic operation in 10 microseconds, and detects the signal component of fine clock mark signal FCM every 160 microseconds. Therefore, it is originally possible to perform the operation sixteen times from detection of a certain signal component to detection of a next signal component. However, various kinds of operations must be performed, e.g., in steps S30, S40 and S50. Therefore, the slice level is arithmetically determined at a rate of one time in 16 times. After the calculation of the FCM slice level (peak value) (step S30), the calculation of the FCM slice level (bottom value) (step S40) and the calculation of the thread servo (step S50), the processing routine ends (step S60).

Figure 11:
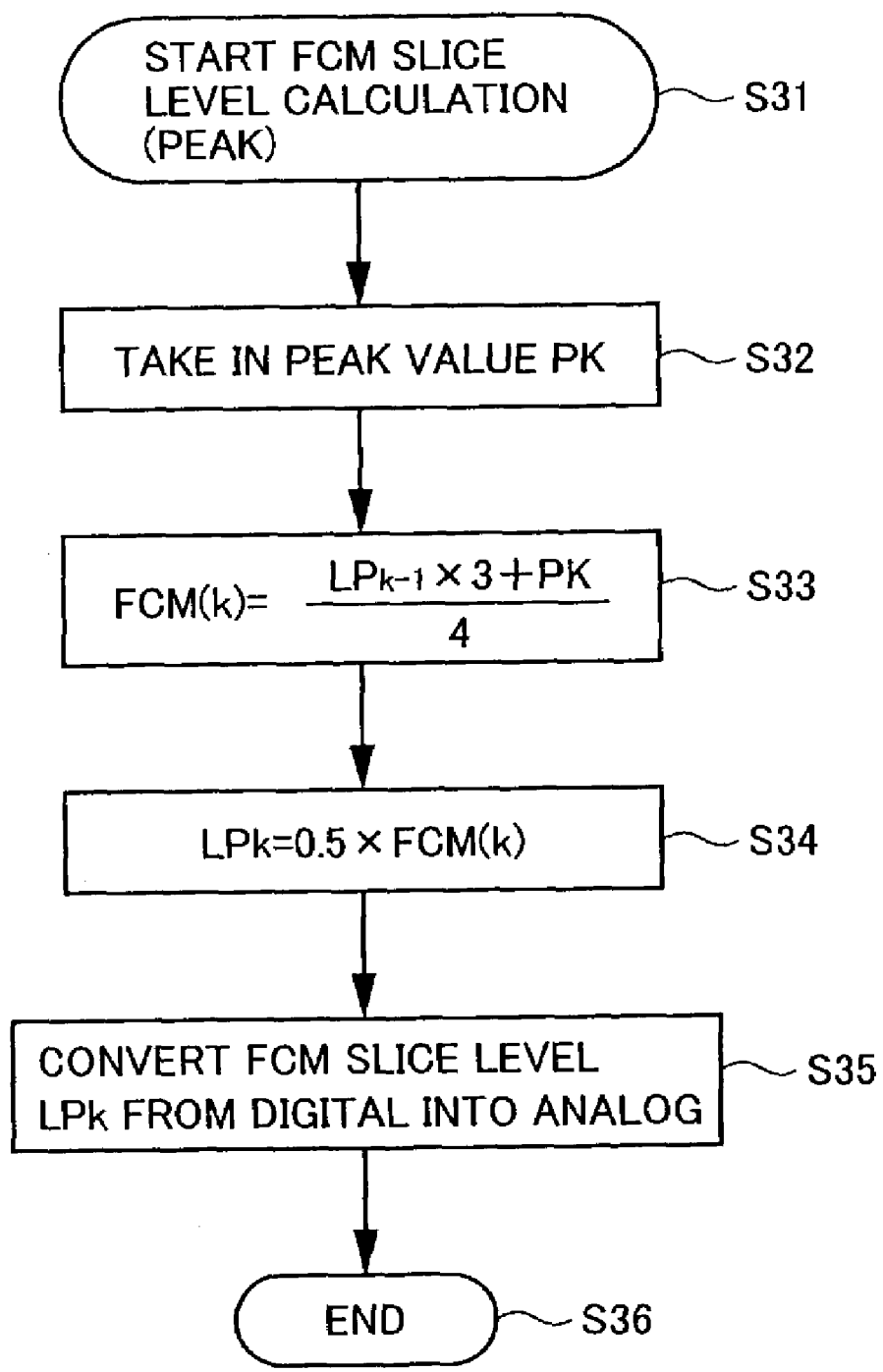
FIG. 11 is a flowchart of calculation of a slice level represented in the flowchart of FIG. 10.

Referring to FIG. 11, description will now be given on the flowchart of calculation of the FCM slice level (peak value). When the calculation starts (step S31), digital signal processor 1045 takes in peak value PK via FCM peak hold circuit 1037 and A/D converter 1042 (step S32), and calculation of $(FCM(k)=(3 \times LPk-1+PK)/4)$ is performed (step S33). Calculation of $(LPk=0.5 \times FCM(k))$ is performed (step S34), and FCM slice level LPk is converted from a digital signal to an analog signal (step S35). Then, the arithmetic operations end (step S36).

The FCM slice level (bottom value) is likewise calculated in accordance with the flowchart of FIG. 11.

Figure 12:
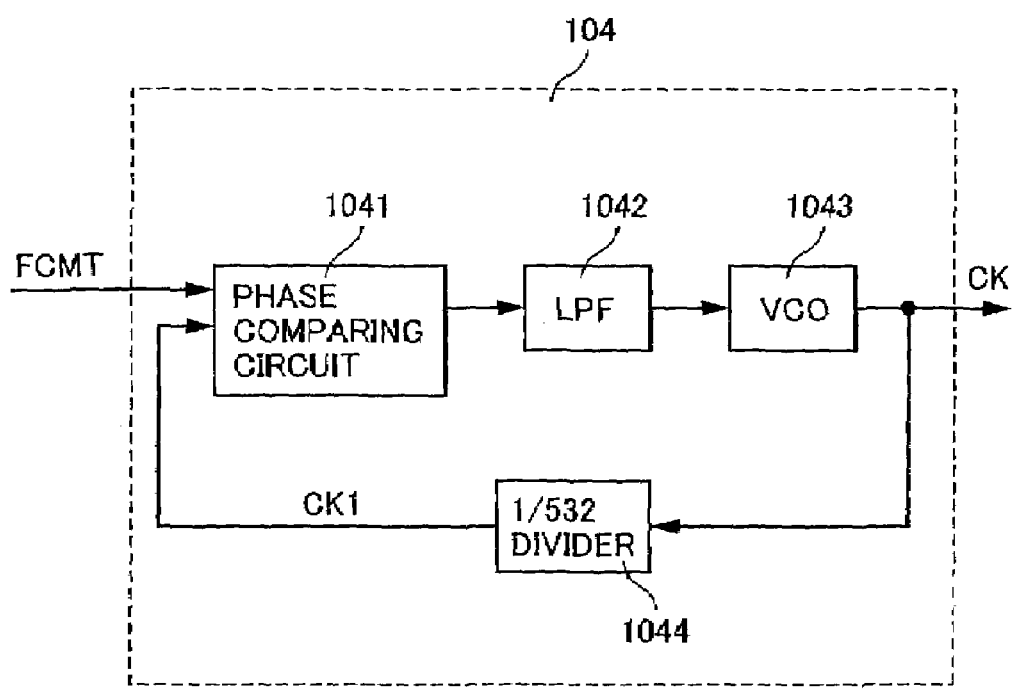
FIG. 12 is a block diagram of a PLL circuit.

Referring to FIG. 12, description will now be given on a structure of PLL circuit 104 in optical disk apparatus 200. PLL circuit 104 includes a phase comparing circuit 1041, an LPF 1042, a voltage control oscillator (VCO) 1043 and a 1/$_{32}$ frequency divider 1044. 1/$_{32}$ frequency divider 1044 divides clock CK generated by voltage control oscillator (VCO) 1043 to provide 1/$_{32}$ of the input frequency. Phase comparing circuit 1041 compares the phase of clock CK1 divided by 1/$_{32}$ frequency divider 1044 with the phase of fine clock mark detection signal FCMT, and generates the error voltage corresponding to the phase difference between these phases. Accordingly, PLL circuit 104 produces clock CK, which is synchronized with fine clock mark detection signal FCMT, and has a period of 1/$_{32}$ of that of fine clock mark detection signal FCMT.

FCM detecting circuit 103 outputs fine clock mark detection signal FCMT detected in the foregoing manner to PLL circuit 104. PLL circuit 104 produces clock CK, which is synchronized with fine clock mark detection signal FCMT as already described with reference to FIG. 12, and is produced by dividing fine clock mark detection signal FCMT to provide 1/$_{32}$ of the original frequency (see FIG. 8).

Figure 13:
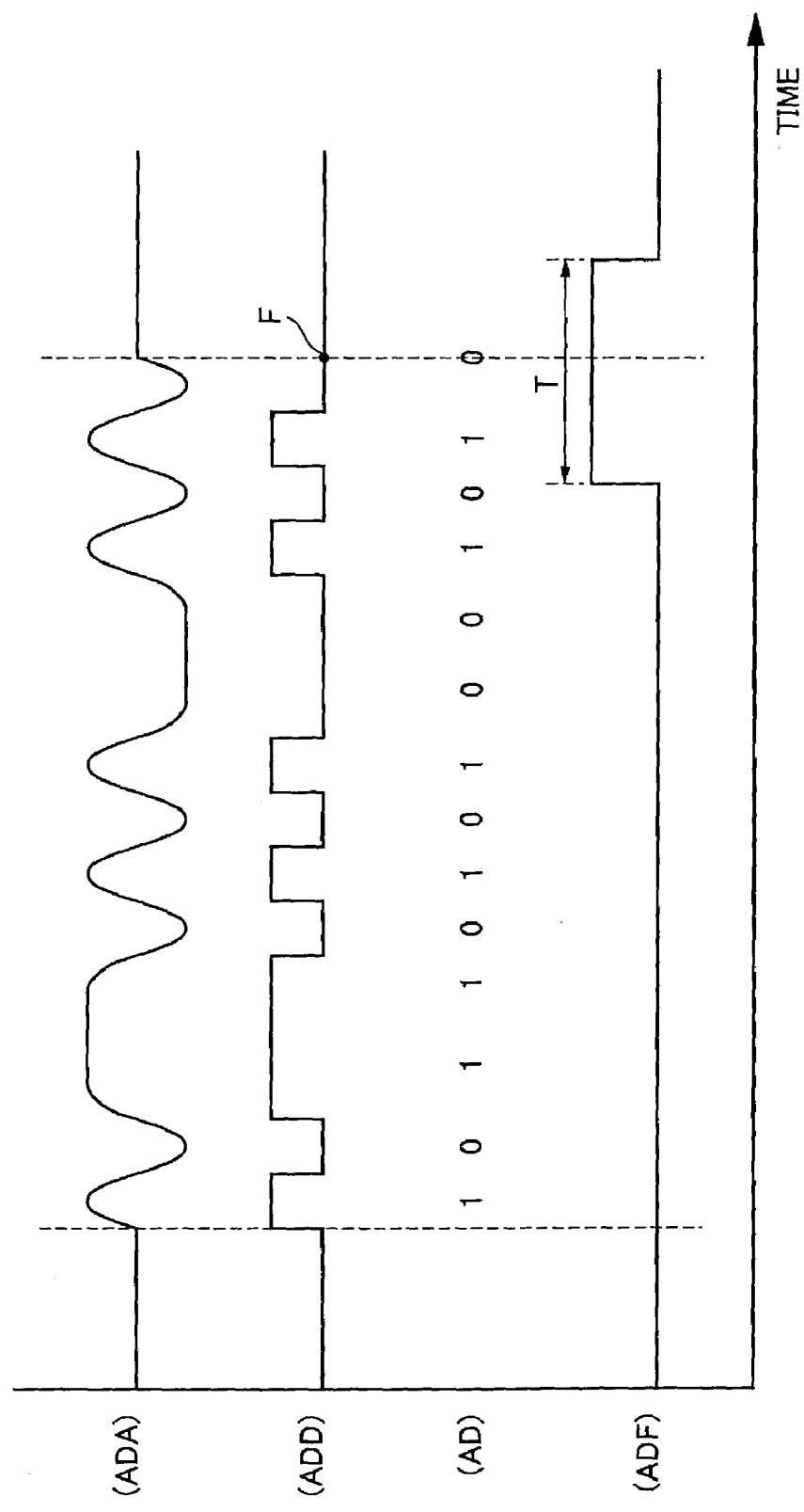
FIG. 13 shows detection of address information and production of an address detection signal.

Referring to FIG. 13, description will now be given on the detection of address information in address detecting circuit 105 and the production of the address detection signal. Optical pickup 102 detects address signal ADA recorded as wobbles in the radial push-pull method as already described with reference to FIG. 4, and applies address signal ADA to address detecting circuit 105. Address detecting circuit 105 produces a binary signal ADD by changing address signal ADA into a binary form, and detects address information AD based on binary signal ADD. Also, address detecting circuit 105 produces address detection signal ADF, which indicates an end position F of the address signal, based on binary signal ADD and address information AD in synchronization with clock CK sent from PLL circuit 104. Address detection signal ADF has a constant length T, which is determined to contain end position F of the address information. Thus, components of clock CK in and between positions corresponding to the start position of binary signal ADD and end position F of the address signal are counted. Assuming that a count value in end position F is equal to K, address detection signal ADF is produced such that a pulse component having a constant length T occurs between count values of (K−m) and (K+m), which are shifted forward and rearward from count value K by m counts, respectively.

Figure 14:
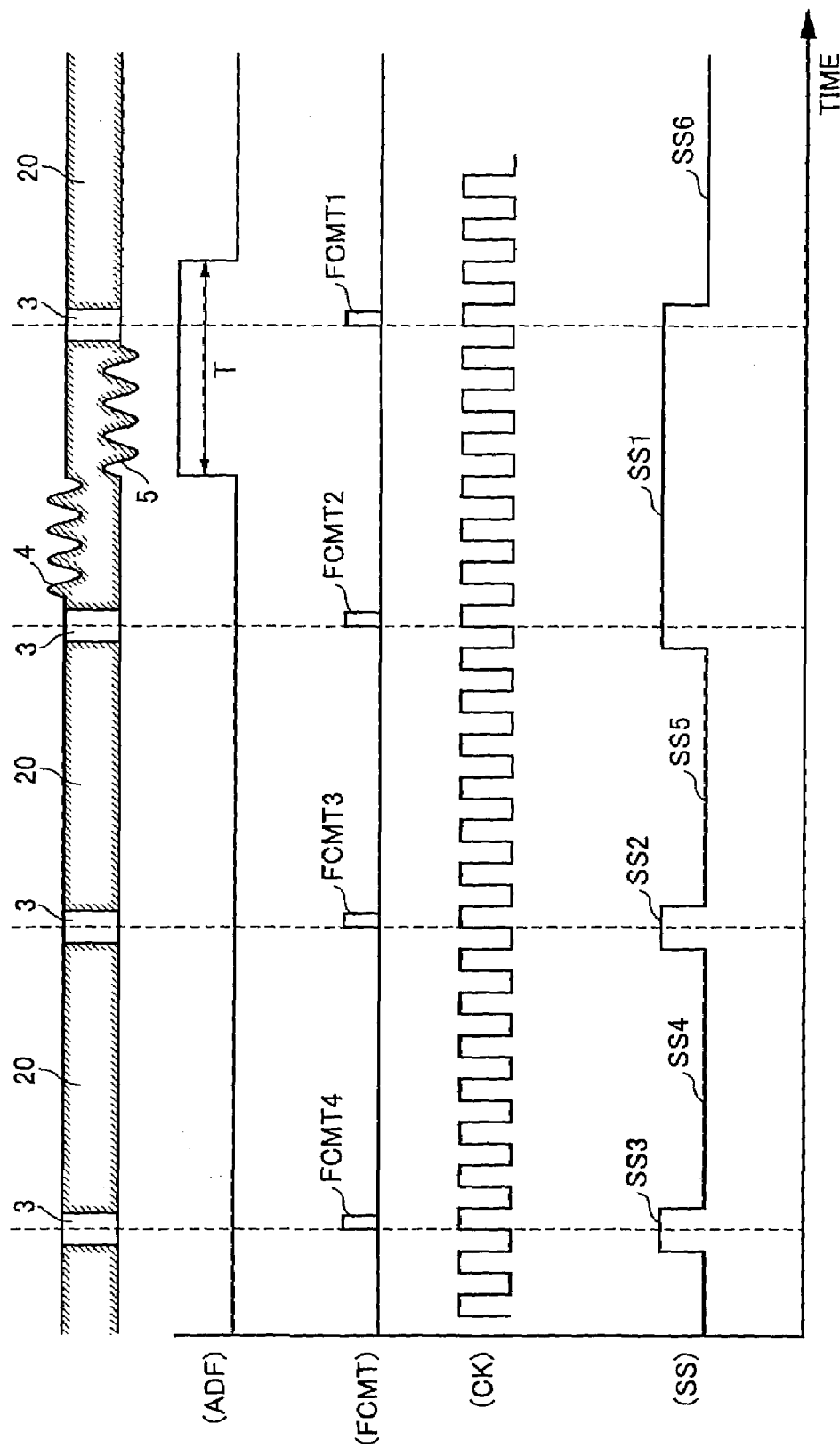
FIG. 14 shows production of a timing signal.

Referring to FIG. 14, description will now be given on production of timing signal SS in timing generating circuit 115. When timing generating circuit 115 receives address detection signal ADF sent from address detecting circuit 105, fine clock mark detection signal FCMT sent from FCM detecting circuit 103 and clock CK sent from PLL circuit 104, timing generating circuit 115 determines whether address detection signal ADF is present in accordance with the timing of fine clock mark detection signal FCMT or not, and produces timing signal SS in synchronization with clock CK. Timing signal SS thus produced is formed a component SS1 including a component FCMT1 of fine clock mark detection signal FCMT, in which address detection signal ADF is present, and components SS2 and SS3 containing only components FCMT3 and FCMT4 of fine clock mark detection signal FCMT. In this case, each of components FCMT1, FCMT2, FCMT3 and FCMT4 of fine clock mark detection signal FCMT is synchronized with a central position of fine clock mark 3, and fine clock mark 3 has a predetermined length of 12 DCBs. Therefore, timing generating circuit 115 produces component SS1 containing regions, where wobbles 4 and 5 are formed, and regions of fine clock marks 3 located on the opposite sides of the regions of wobbles 4 and 5. Timing generating circuit 115 also produces components SS2 and SS3 containing regions of fine clock marks 3, which correspond to components FCMT3 and FCMT4 of fine clock mark detection signal FCMT, respectively, and further produces components SS4, SS5 and SS6 each corresponding to region 20 for recording the user data.

Figure 15:
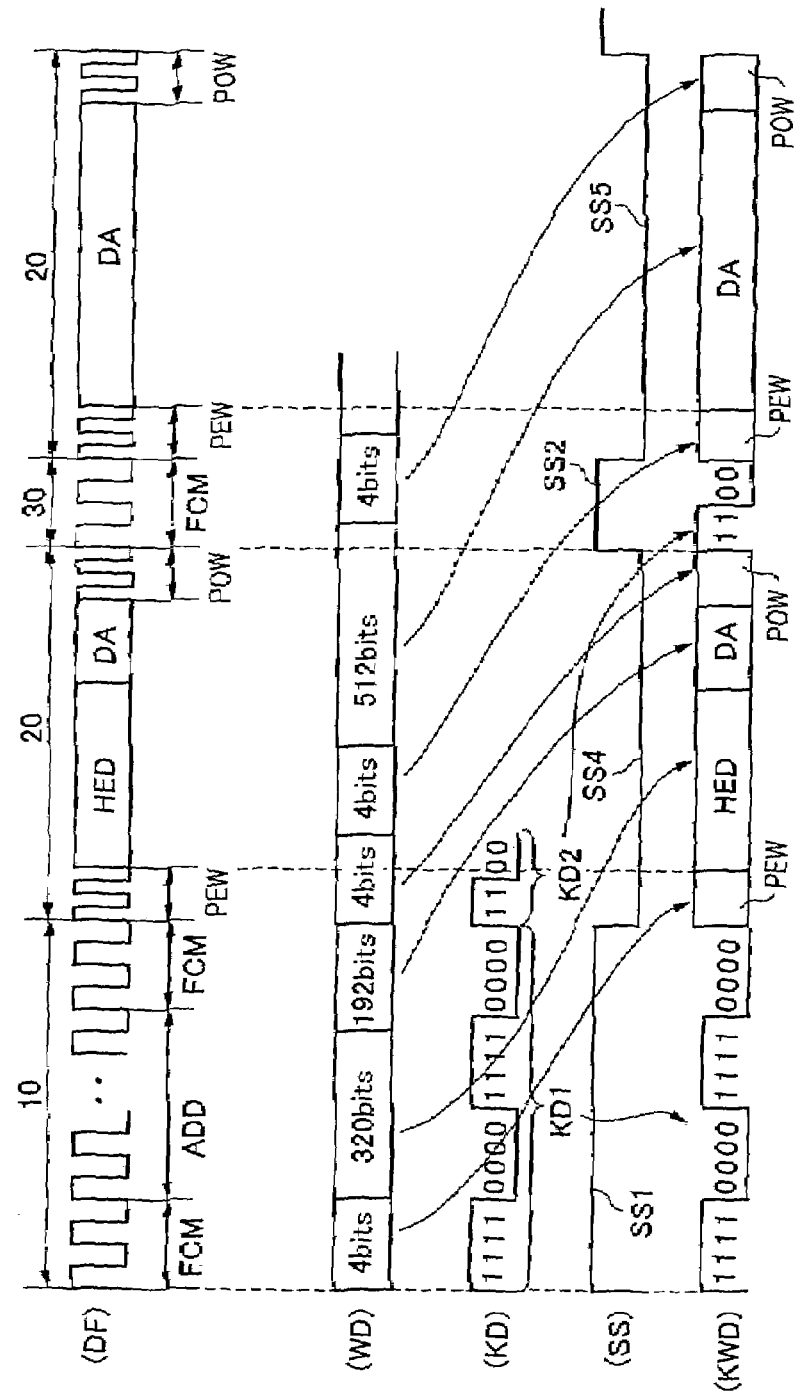
FIG. 15 shows record data rows recorded on a magneto-optical record medium by the optical disk apparatus.

Referring to FIG. 15, description will now be given on the operation of selector circuit 120 in format circuit 126 shown in FIG. 3. When selector circuit 120 receives timing signal SS from timing generating circuit 115, selector circuit 120 selects record data (WD) sent from data modulating circuit 117 or pattern data (KD) sent from pattern generating circuit 119 based on timing signal SS. Selector circuit 120 selects pattern data (KD) sent from pattern generating circuit 119 when timing signal SS is at H-level, and selects record data (WD) sent from data modulating circuit 117 when timing signal SS is at L-level.

When data structure (DF) on magneto-optical record medium 100 has a structure of FCM/ADD/FCM/PEW/ HED/DA/POW/FCM/PEW/DA/POW, data modulating circuit 117 outputs record data (WD). When pattern generating circuit 119 outputs pattern data (KD), selector circuit 120 selects pattern data "1111000011110000" sent from pattern generating circuit 119 based on component SS1 of timing signal SS, and outputs it to magnetic head drive circuit 123. Then, selector circuit 120 selects pre-write PEW of 4 bits, header HED of 320 bits, data DA of 192 bits and post-write POW of 4 bits from record data sent from data modulating circuit 117 based on component SS4, and outputs them to magnetic head drive circuit 123. Then, selector circuit 120 selects data pattern "1100" sent from pattern generating circuit 119 based on component SS2, and outputs it to magnetic head drive circuit 123. Then, selector circuit 120 selects pre-write PEW of 4 bits, data DA of 512 bits and post-write POW of 4 bits from record data (WD) sent from data modulating circuit 117 based on component SS5, and outputs them to magnetic head drive circuit 123. Thereby, record data rows (KWD) are output to magnetic head drive circuit 123.

When record data rows (KWD) are output to magnetic head drive circuit 123, a magneto-optical signal of "1111000011110000" is recorded in region 10 on magneto-optical record medium 100 provided with FCM/ADD/FCM as can be seen from FIG. 15, and magneto-optical signal "1100" is recorded in region 30 provided with FCM. As described above, magneto-optical signals are recorded in the whole regions of data structure (DF) on magneto-optical record medium 100. This is for the purpose of suppressing DC components in the reproduced signal when data is reproduced from region 20, i.e., user data region.

Figure 16:
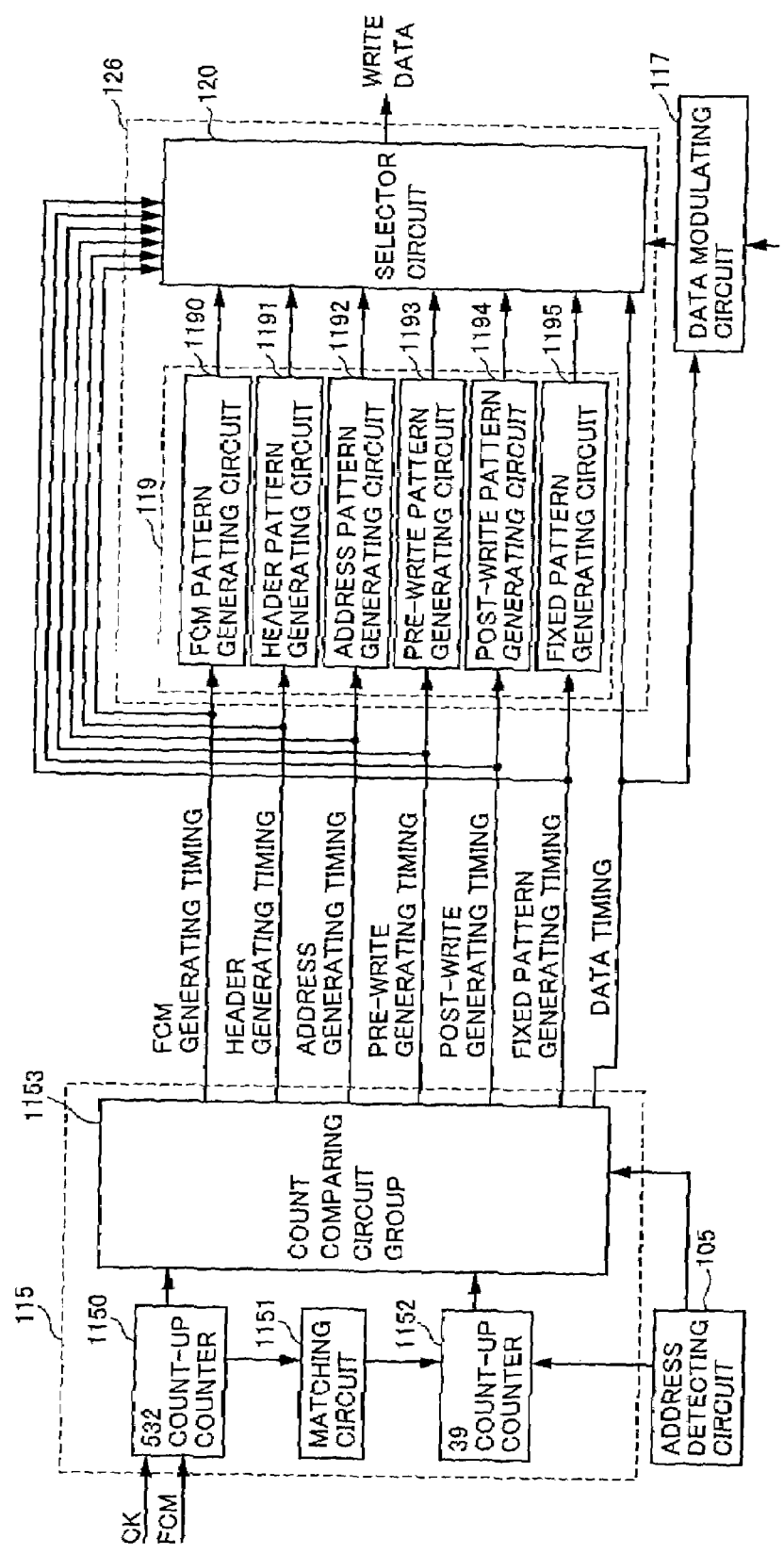
FIG. 16 is a schematic block diagram of a format circuit in the embodiment of the invention.

Referring to FIG. 16, description will now be given on pattern generating circuit 119 and selector 120 forming format circuit 126 as well as timing generating circuit 115 in optical disk apparatus 200 shown in FIG. 3.

Timing generating circuit 115 includes a 532 count-up counter 1150, a matching circuit 1151, a 39 count-up counter 1152 and a count comparing circuit group 1153. When 532 count-up counter 1150 receives fine clock mark detection signal FCMT from FCM detecting circuit 103, 532 count-up counter 1150 is reset, and counts clock CK applied from PLL circuit 104 for applying the count to matching circuit 1151 and count comparing circuit group 1153. Matching circuit 1151 determines whether the maximum value of the count applied from 532 count-up counter 1150 is equal to 531 or not, and outputs a match signal MTC to 39 count-up counter 1152 when the maximum value is equal to 531. Address detection signal ADF applied from address detecting circuit 105 resets 39 count-up counter 1152 so that 39 count-up counter 1152 counts match signal MTC, and outputs the count to count comparing circuit group 1153.

Count comparing circuit group 1153 specifies segments S0–S38 on magneto-optical record medium 100 based on the count applied from 39 count-up counter 1152, and specifies the positions of the fine clock mark, address, pre-write, post-write, header and data in each of segments S0–S38 based on the count applied from 532 count-up counter 1150. Count comparing circuit group 1153 outputs fine clock mark timing signals TSFCM1–TSFCM3 to an FCM pattern generating circuit 1190 of pattern generating circuit 119 and selector circuit 120 based on the specified position of the fine clock mark. Further, count comparing circuit group 1153 outputs header timing signal TSHED to a header pattern generating circuit 1191 of pattern generating circuit 119 and selector circuit 120 based on the specified position of the header. Further, count comparing circuit group 1153 outputs address timing signal TSAD to an address pattern generating circuit 1192 of pattern generating circuit 119 and selector circuit 120 based on the specified position of the address. Further, count comparing circuit group 1153 outputs pre-write timing signals TSPRW1 and TSPRW2 to a pre-write pattern generating circuit 1193 of pattern generating circuit 119 and selector circuit 120 based on the specified position of the pre-write. Further, count comparing circuit group 1153 outputs post-write timing signals TSPOW1 and TSPOW2 to a post-write pattern generating circuit 1194 of pattern generating circuit 119 and selector circuit 120 based on the specified position of the post-write. Further, count comparing circuit group 1153 outputs data timing signals TSDA1 and TSDA2 to format circuit 118 and selector circuit 120 based on the specified position of the data. When count comparing circuit group 1153 receives a defective frame detection signal from address detecting circuit 105, it outputs a fixed timing signal TSHLD to a fixed pattern generating circuit 1195 of pattern generating circuit 119 and selector circuit 120.

Pattern generating circuit 119 is formed of FCM pattern generating circuit 1190, header pattern generating circuit 1191, address pattern generating circuit 1192, pre-write pattern generating circuit 1193, post-write pattern generating circuit 1194 and fixed pattern generating circuit 1195. FCM pattern generating circuit 1190 produces pattern data, which is to be recorded in a region provided with the fine clock marks, in synchronization with fine clock mark timing signals TSFCM1-TSFCM3, and outputs it to selector circuit 120. Header pattern generating circuit 1191 produces pattern data to be recorded in the header region in synchronization with header timing signal TSHED, and outputs it to selector circuit 120.

Address pattern generating circuit 1192 produces pattern data to be recorded in the address region in synchronization with address timing signal TSAD, and outputs it to selector circuit 120. Pre-write pattern generating circuit 1193 produces pattern data to be recorded in the pre-write region in synchronization with pre-write timing signals TSPRW1 and TSPRW2, and outputs it to selector circuit 120.

Post-write pattern generating circuit 1194 produces pattern data to be recorded in the post-write region in synchronization with post-write timing signals TSPOW1 and TSPOW2, and outputs it to selector circuit 120. Fixed pattern generating circuit 1195 produces pattern data to be recorded in a scratched or damaged frame in synchronization with fixed timing signal TSHLD, and outputs it to selector circuit 120.

Selector circuit 120 outputs pattern data, which is applied from FCM pattern generating circuit 1190 and is to be recorded in the fine clock mark region, to magnetic head drive circuit 123 in synchronization with fine clock mark timing signals TSFCM1-TSFCM3 applied from count comparing circuit group 1153. Also, selector circuit 120 outputs pattern data, which is applied from FCM pattern generating circuit 1190 and is to be recorded in the header region, to magnetic head drive circuit 123 in synchronization with header timing signal TSHED applied from count comparing circuit group 1153. Further, selector circuit 120 outputs pattern data, which is applied from address pattern generating circuit 1192 and is to be recorded in the address region, to magnetic head drive circuit 123 in synchronization with the address timing signal TSAD applied from count comparing circuit group 1153. Further, selector circuit 120 outputs pattern data, which is applied from pre-write pattern generating circuit 1193 and is to be recorded in the pre-write region, to magnetic head drive circuit 123 in synchronization with pre-write timing signals TSPRW1 and TSPRW2 applied from count comparing circuit group 1153. Further, selector circuit 120 outputs pattern data, which is applied from post-write pattern generating circuit 1194 and is to be recorded in the post-write region, to magnetic head drive circuit 123 in synchronization with post-write timing signals TSPOW1 and TSPOW2 applied from count comparing circuit group 1153. Further, selector circuit 120 outputs pattern data, which is applied from fixed pattern generating circuit 1195 and is to be recorded in whole the defective frames, in synchronization with fixed timing signal TSHLD applied from count comparing circuit group 1153.

Figure 17:
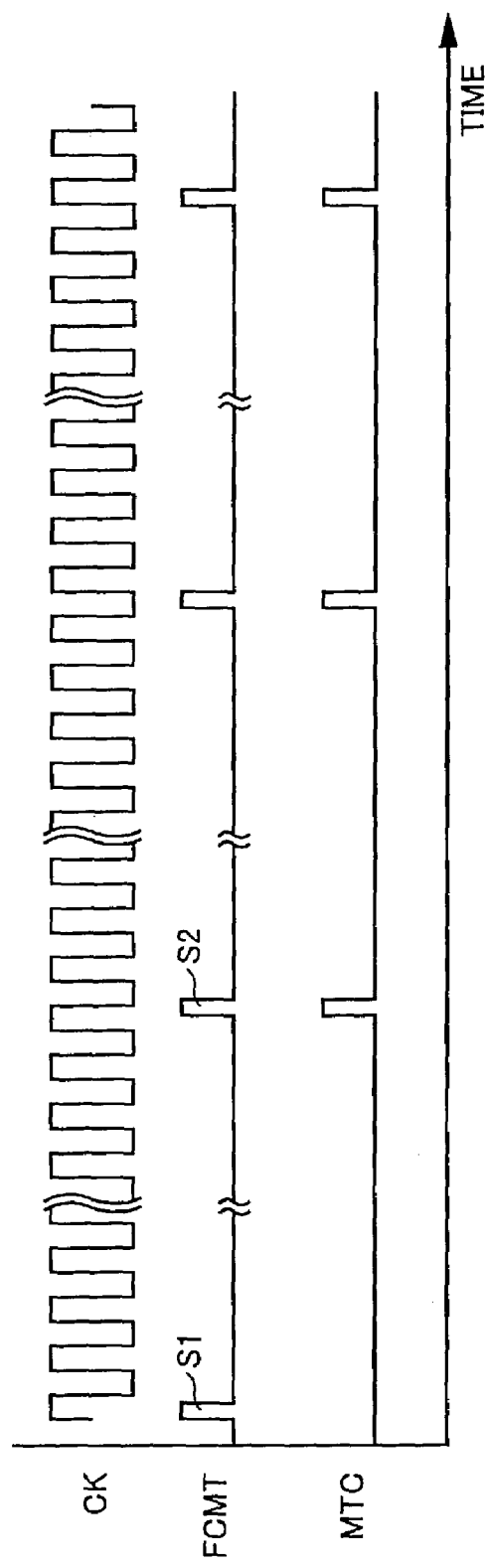
FIG. 17 is a timing chart of signals for operating operations of a 532 count-up counter and a 39 count-up counter in a timing generating circuit shown in FIG. 16.
Figure 18:
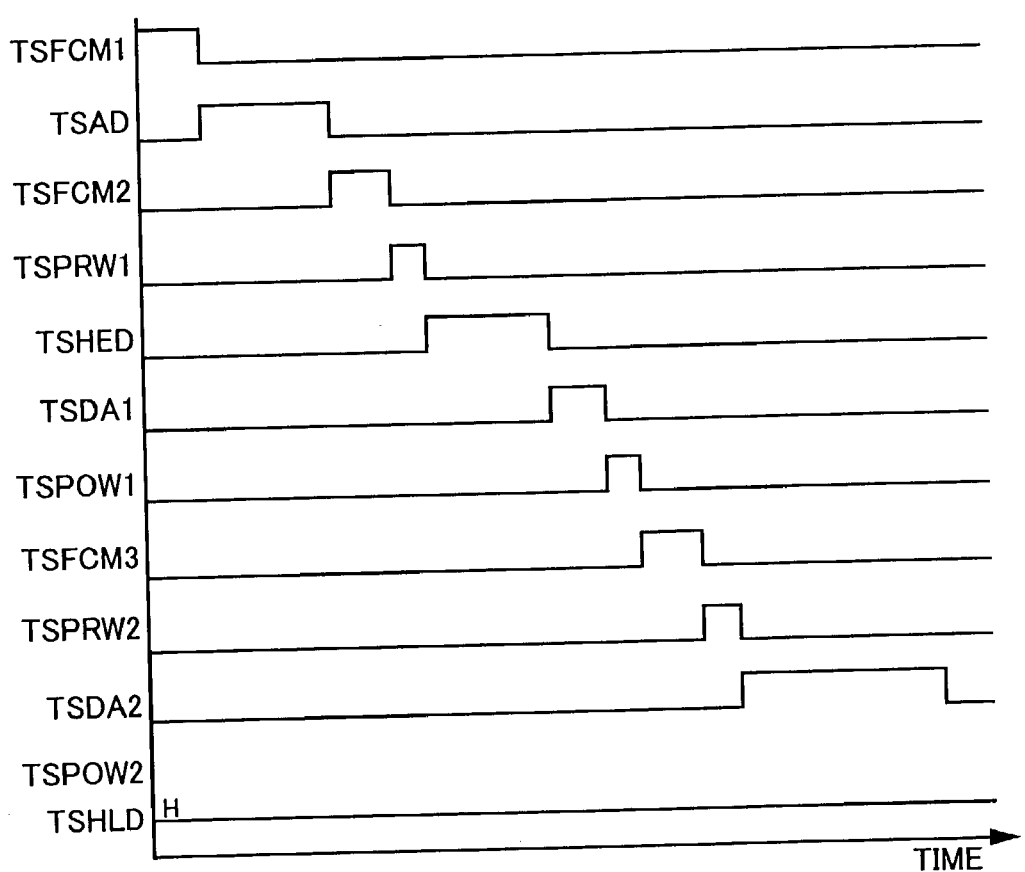
FIG. 18 is a timing chart showing timing signals produced by the timing generating circuit shown in FIG. 16.
Figure 19:
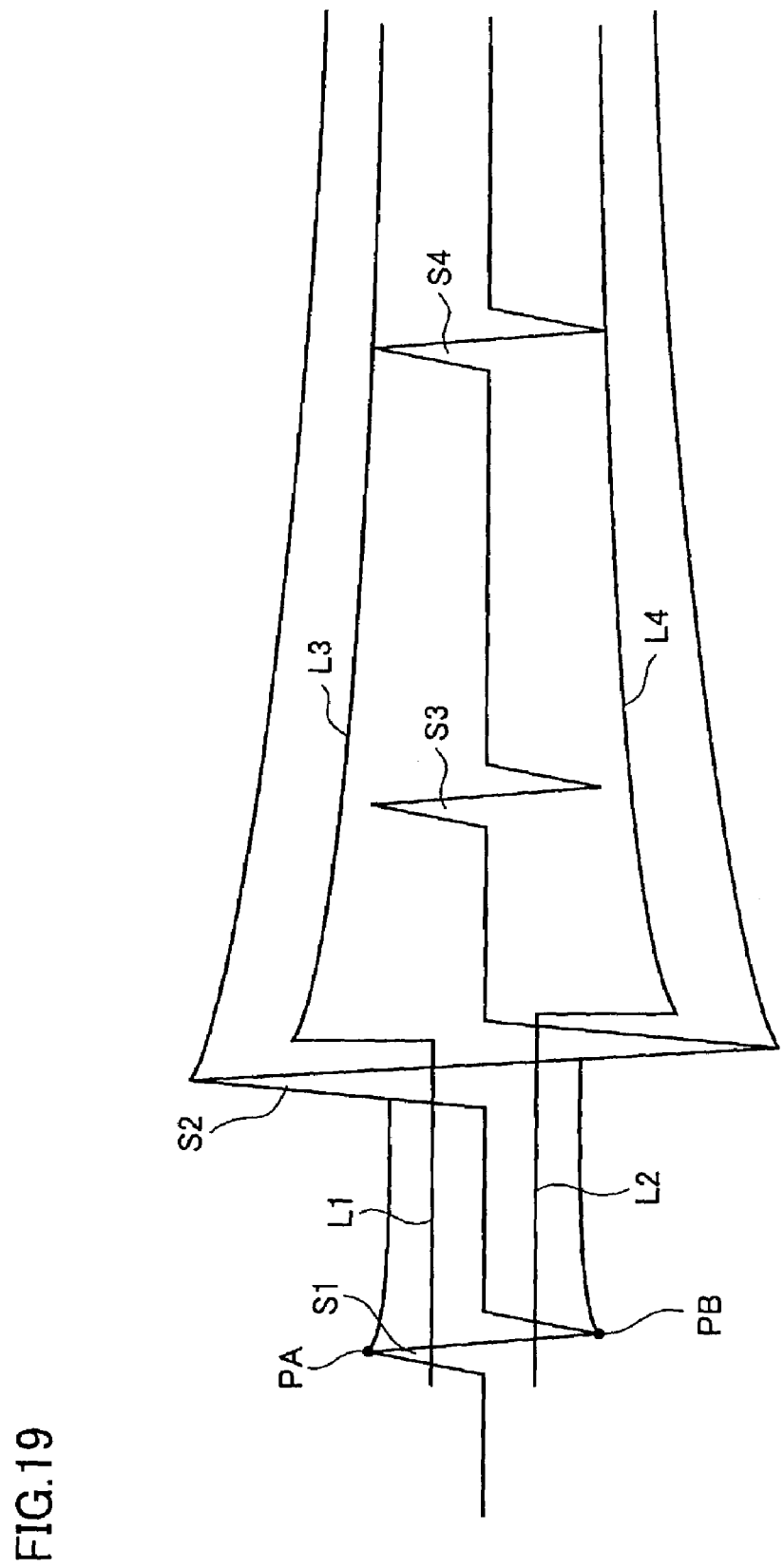
FIG. 19 is a waveform diagram of a fine clock mark signal for showing a conventional problem.

Referring to FIGS. 16–18, description will now be given on the operations of timing generating circuit 115, pattern generating circuit 119 and selector circuit 120. When FCM detecting circuit 103 applies fine clock mark detection signal FCMT to 532 count-up counter 1150 in timing generating circuit 115, 532 count-up counter 1150 resets its count, and counts clock CK applied from PLL circuit 104. Thus, 532 count-up counter 1150 is reset when it receives components S1, S2, . . . of fine clock mark detection signal FCMT, and counts clock CK between neighboring components S1 and S2. Since 532 clock components are usually present between neighboring components S1 and S2 of fine clock mark detection signal FCMT, 532 count-up counter 1150 outputs a count of 0–531 to matching circuit 1151 and count comparing circuit group 1153.

Thereby, matching circuit 1151 determines whether the maximum count among the received counts is equal to 531 or not, and sends match signal MTC to 39 count-up counter 1152 when the maximum count is equal to 531. Thereby, 39 count-up counter 1152 is reset when it receives address detection signal ADF from address detecting circuit 105, and counts match signal MTC to output the count of 0–38 to count comparing circuit group 1153. Since address detection signal ADF is input in response to each frame, and thus every 39 segments, 39 count-up counter 1152 outputs the count of 0–38 to count comparing circuit group 1153.

Count comparing circuit group 1153 recognizes segment S0, i.e., a region where address information AD is pre-formatted when count applied from 39 count-up counter 1152 is equal to 0. When the count of 532 count-up counter 1150 is in a range of 0–11, or 12–531, count comparing circuit group 1153 recognizes the fine clock mark region in segment or the address region. Count comparing circuit group 1153 produces fine clock mark timing signal TSFCM1 and address timing signal TSAD, and applies them to FCM pattern generating circuit 1190 and address pattern generating circuit 1192, respectively.

When the count applied from 39 count-up counter 1152 is equal to 1, count comparing circuit group 1153 recognizes segment S1. Then count comparing circuit group 1153 recognizes the fine clock mark region, pre-write region, header region, data region or post-write region when the count of 532 count-up counter 1150 is in a range of 0–11, 12–15, 16–335, 336–525 or 526–529. Count comparing circuit group 1153 selectively outputs fine clock mark timing signal TSFCM3, pre-write timing signal TSPRW1, header timing signal TSHED, data timing signal TSDA1 and post-write timing signal TSPOW1 to output them to FCM pattern generating circuit 1190, pre-write pattern generating circuit 1193, header pattern generating circuit 1191, data modulating circuit 117 and post-write pattern generating circuit 1194, respectively.

When the count applied from 39 count-up counter 1152 is in a range from 2 to 38, count comparing circuit group 1153 recognizes segment S2–S38. Then, count comparing circuit group 1153 recognizes the fine clock mark region, pre-write region, data region or post-write region when the count applied from 532 count-up counter 1150 is in a range of 0–11, 12–15, 16–527 or 528–531. Count comparing circuit 1153 selectively produces fine clock mark timing signal TSFCM3, pre-write timing signal TSPRW2, data timing signal TSDA2 and post-write timing signal TSPOW2 to output them to FCM pattern generating circuit 1190, pre-write pattern generating circuit 1193, data modulating circuit 117 and post-write pattern generating circuit 1194, respectively.

FCM pattern generating circuit 1190 produces pattern data "111100001111" of 12 DCBs to output it to selector circuit 120 in synchronization with each of fine clock mark timing signals TSFCM1-TSFCM3. Header pattern generating circuit 1191 produces pattern data of "11001100 . . . 1100111111110000000011111111100000000 . . . 1111111100000000" to output it to selector circuit 120 in synchronization with header timing signal TSHED. The pattern data of 320 DCBs is pattern data for recording a predetermined number of signals of 2T at intervals of 2T as well as a predetermined number of signals of 8T at intervals of 8T, and is used for determining an optimum intensity of the laser beam, an optimum phase of the clock for sampling the reproduction signal and others.

Address pattern generating circuit 1192 produces pattern data "1111000011110000 . . . 11110000" of 520 DCBs in synchronization with address timing signal TSAD, and outputs it to selector circuit 120. Pre-write pattern generating circuit 1193 produces pattern data "0011" of 4 DCBs in synchronization with pre-write timing signals TSPRW1 and TSPRW2, and outputs it to selector circuit 120. Post-write pattern generating circuit 1194 produces pattern data "1100" of 4 DCBs in synchronization with post-write timing signals TSPOW1 and TSPOW2, and outputs it to selector circuit 120. Fixed pattern generating circuit 1195 produces pattern data "1111000011110000 . . . 11110000" of 20748 (=532×39) DCBs in synchronization with fixed pattern timing signal TSHLD, and output it to selector circuit 120.

Selector circuit 120 applies pattern data "111100001111" of 12 DCBs to magnetic head drive circuit 123 in synchronization with fine clock mark timing signal TSFCM1, and applies pattern data "1111000011110000 . . . 11110000" of 520 DCBs to magnetic head drive circuit 123 in synchronization with address timing signal TSAD.

Selector circuit 120 outputs pattern data "111100001111" of 12 DCBs to magnetic head drive circuit 123 in synchronization with fine clock mark timing signal TSFCM2, and outputs pattern data "0011" of 4 DCBs to magnetic head drive circuit 123 in synchronization with pre-write timing signal TSPRW.

Further, selector circuit 120 outputs pattern data "1100110011001100 . . . 1111111100000000111111111" of 320 DCBs to magnetic head drive circuit 123 in synchronization with header timing signal TSHED, and outputs the record data of 192 DCBs to magnetic head drive circuit 123 in synchronization with data timing signal TSDA1.

Further, selector circuit 120 outputs pattern data "1100" of 4 DCBs to magnetic head drive circuit 123 in synchronization with post-write timing signal TSPOW, and outputs pattern data "111100001111" of 12 DCBs to magnetic head drive circuit 123 in synchronization with fine clock mark timing signal TSFCM3.

Further, selector circuit 120 outputs pattern data "0011" of 4 DCBs to magnetic head drive circuit 123 in synchronization with pre-write timing signal TSPRW, outputs record data of 512 DCBs to magnetic head drive circuit 123 in synchronization with data timing signal TSDA2 and outputs pattern data "1100" of 4DCBs to magnetic head drive circuit 123 in synchronization with post-write timing signal TSPOW. Further, selector circuit 120 outputs data "11110000 . . . 11110000" of 20748 DCBs to magnetic head drive circuit 123 in synchronization with fixed pattern timing signal TSHLD.

Thereby, record data rows (KWD) shown in FIG. 15 are applied to magnetic head drive circuit 123, and are recorded on magneto-optical record medium 100.

Referring to FIG. 3 again, description will now be given on an operation of recording data on magneto-optical record medium 100 in optical disk apparatus 200. When magneto-optical record medium 100 is loaded into optical disk apparatus 200, controller 114 controls a servo mechanism (not shown) to drive spindle motor 101 at a predetermined rotation speed, and controls laser drive circuit 124 via timing generating circuit 115 to emit a laser beam of a predetermined intensity from optical pickup 102.

Thereby, the servo mechanism (not shown) drives spindle motor 101 at a predetermined rotation speed, and spindle motor 101 drives magneto-optical record medium 100 at a predetermined rotation speed. Optical pickup 102 collectively emits the laser beams of a predetermined intensity to magneto-optical record medium 100 via an objective lens (not shown), and detects a beam reflected therefrom. Optical pickup 102 outputs a focus error signal and a tracking error signal to the servo mechanism (not shown) so that the servo mechanism turns on the focus servo and tracking servo of the objective lens in optical pickup 102 based on the focus error signal and the tracking error signal.

Thereafter, optical pickup 102 detects fine clock mark signal FCM from magneto-optical record medium 100 in the tangential push-pull method, and applies fine clock mark signal FCM thus detected to FCM detecting circuit 103. FCM detecting circuit 103 accurately produces fine clock mark detection signal FCMT from fine clock mark signal FCM in the method already described, and applies fine clock mark detection signal FCMT thus produced to PLL circuit 104 and timing generating circuit 115. PLL circuit 104 produces clock CK based on fine clock mark detection signal FCMT, and applies clock CK thus produced to address detecting circuit 105, controller 114, timing generating circuit 115, data modulating circuit 117 and format circuit 126.

Address detecting circuit 105 receives the address signal, which is detected by optical pickup 102 from segment S0 on magneto-optical record medium 100 in the radial push-pull method, and detects address information AD in synchronization with clock CK applied from PLL circuit 104. Also, address detecting circuit 105 produces address detection signal ADF, which indicates the detection of address information AD, in the end position of the address information. Address information AD thus detected is output to controller 114, and address detection signal ADF thus produced is output to header detecting circuit 113 and timing generating circuit 115.

BCH encoder 116 adds an error correction code to the record data, and data modulating circuit 117 modulates the record data sent from BCH encoder 116 into a predetermined format in synchronization with clock CK sent from PLL circuit 104. Data modulating circuit 117 outputs the modulated record data to format circuit 126.

Timing generating circuit 115 produces a timing signal for producing a record signal to be recorded in the data region of magneto-optical record medium 100 based on the address information applied from address detecting circuit 105. Timing generating circuit 115 applies the timing signal thus produced to selector circuit 120, magnetic head drive circuit 123 and laser drive circuit 124.

Selector circuit 120 selects the record signal applied from data modulating circuit 117 in accordance with the timing signal, and applies it to magnetic head drive circuit 123. Magnetic head drive circuit 123 drives magnetic head 125 so that the magnetic field modulated by the record signal is produced in synchronization with the timing signal. Laser drive circuit 124 drives the semiconductor laser (not shown) in optical pickup 102 in synchronization with the timing signal, and optical pickup 102 collectively emits the laser beam to magneto-optical record medium 100 via the objective lens (not shown). Magnetic head 125 applies the magnetic field modulated by the record signal to magneto-optical record medium 100. Thereby, the record data is recorded on magneto-optical record medium 100.

Description will now be given on the operation of reproducing the signal from magneto-optical record medium 100 by optical disk apparatus 200. Magneto-optical record medium 100 is loaded into optical disk apparatus 200, and the focus servo and tracking servo of the objective lens are performed. Also, clock CK is produced, and the address information is detected. These operations are the same as those for recording the signal. The detected address information is applied to controller 114.

Header detecting circuit 113 detects the position of the header included in the reproduced signal based on the address information AD sent from controller 114 and address detection signal ADF sent from address detecting circuit 105, and produces the timing signals of the pre-write and header from the reproduced signal in synchronization with clock CK sent from PLL circuit 104. The timing signal of the header thus produced is applied to unformat circuit 110 and data demodulating circuit 111.

Optical pickup 102 applies reproduced signal thus detected to BPF 106, which cuts off high and low ranges of the reproduced signal. A/D converter 107 converts the reproduced signal applied from BPF 106 from the analog signal into the digital signal in synchronization with clock CK sent from PLL circuit 104.

Waveform equalizing circuit 108 performs PR(1, 1) waveform equalization on the reproduced signal converted into the digital signal in synchronization with clock CK sent from PLL circuit 104. Thus, the equalization is performed such that the waveform interference is performed at a rate of one to one between the data preceding the detected signal and the data following the same.

Thereafter, Viterbi decoding circuit 109 converts the reproduced signal already subjected to the waveform equalization from a multi-valued form into a binary form in synchronization with clock CK sent from PLL circuit 104, and applies the reproduced signal thus converted to unformat circuit 110 and header detecting circuit 113.

Thereby, header detecting circuit 113 detects the position of the header included in the reproduced signal based on address information AD applied from controller 114 and address detection signal ADF applied from address detecting circuit 105, and produces the timing signals of the pre-write and header from the reproduced signal in synchronization with clock CK sent from PLL circuit 104. The timing signal of the header thus produced is applied to unformat circuit 110 and data demodulating circuit 111.

Unformat circuit 110 removes the pre-write, post-write and header recorded in the user data region of magneto-optical record medium 100 based on the timing signal applied from header detecting circuit 113. Data demodulating circuit 111 receives the reproduced signal in the unformatted form in synchronization with clock CK sent from PLL circuit 104, and performs the demodulation for decoding the digital modulation performed at the time of recording. BCH decoder 112 performs the error correction on the reproduced signal thus reproduced, and outputs it as the reproduced data. Thereby, reproduction of the signal from magneto-optical record medium 100 is completed.

According to the embodiment of the invention, the comparison level for comparing the signal components of the fine clock mark signal is arithmetically determined based on the average weighted such that a larger weight is assigned to the comparison level of the signal component already subjected to the comparison. Therefore, the fine clock mark signal can be accurately detected, and the clock can be accurately produced even if the magneto-optical record medium is scratched.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

According to the invention, since the comparison level for comparing the signal components of the fine clock mark signal is arithmetically determined based on the average weighted such that a larger weight is assigned to the comparison level of the signal component already subjected to the comparison, the clock can be accurately produced based on the fine clock mark signal even when a signal component due to a scratch on the magneto-optical record medium is detected. Accordingly, the invention can be applied to the optical disk apparatus, which produces the clock by comparing the fine clock mark signal with reference to a predetermined level.

What is claimed is:

1. An optical disk apparatus (200) for recording and/or reproducing a signal on and/or from an optical disk (100) including a fine clock mark forming a reference for generation of a clock in synchronization with said clock, comprising:

an optical pickup (102) emitting a laser beam to said optical disk (100) and detecting a reflected beam;

a fine clock mark detecting circuit (103) producing a fine clock mark detection signal by comparing a fine clock mark signal detected based on said fine clock mark by said optical pickup (102) with reference to a predetermined level; and a clock producing circuit (104) producing said clock by dividing said fine clock mark detection signal to provide a frequency equal to a predetermined integral submultiple of the input frequency in synchronization with said fine clock mark detection signal, wherein said fine clock mark detecting circuit (103) compares a signal component FCMk ($1 \leq k \leq n$) with reference to a comparison level Lk, and produce said fine clock mark detection signal based on the fact that the compared comparison signal is obtained, assuming that said fine clock mark signal includes signal components of n (n: natural number) in number containing said signal component FCMk to be compared and a signal component FCMk−1 compared immediately before comparison of said signal component FCMk, a comparison level Lk−1 is used for said signal component FCMk−1, said signal component FCMk has an amplitude of Pk, and said comparison level Lk is determined based on a weighted average of said comparison level Lk−1 and said amplitude Pk obtained by assigning a larger weight to said comparison level Lk−1 than a weight assigned to said amplitude Pk.

2. The optical disk apparatus according to claim 1, wherein said fine clock mark detecting circuit (103) produces a first comparison signal prepared by comparing said signal component with reference to a first level set on a peak side of said signal component FCMk, and a second comparison signal prepared by comparing said signal component FCMk with reference to a second level set on a bottom side of said signal component FCMk, and produces said fine clock mark detection signal based on the fact that said first or second comparison signal is obtained;

said first level is determined based on said weighted average using a comparison level LPk−1 set on the peak side of said signal component FCMk−1 and a peak value PPk of said signal component FCMk; and said second level is determined based on said weighted average using a comparison level LBk−1 set on the bottom side of said signal component FCMk−1 and a bottom value PBk of said signal component FCMk.

3. The optical disk apparatus according to claim 2, wherein said fine clock mark detecting circuit (103) includes:

a first comparator (1033) producing said first comparison signal by comparing said signal component FCMk with reference to said first level, a second comparator (1034) producing said second comparison signal by comparing said signal component FCMk with reference to said second level, a first hold circuit (1037) holding said peak value PPk based on said signal component FCMk, a second hold circuit (1038) holding said bottom value PBk based on said signal component FCMk, a third comparator (1047) producing a third comparison signal by comparing said signal component FCMk with reference to said predetermined level, and a signal processing circuit (1045) producing said fine clock mark detection signal based on said third comparison signal by arithmetically determining said first level from a weighted average using said comparison level LPk−1 and said peak value PPk, arithmetically determining said second level from a weighted average using said comparison level LBk−1 and said bottom value PBk, and arithmetically determining said predetermined level based on said peak and bottom values PPk and PBk in response to input of said first or second comparison signal.

4. The optical disk apparatus according to one of claims 1 to 3, wherein said optical pickup (102) detects said fine clock mark signal in a tangential push-pull method.

* * * * *